(12) United States Patent
Evans

(10) Patent No.: US 10,366,536 B2
(45) Date of Patent: Jul. 30, 2019

(54) INFINITE FAR-FIELD DEPTH PERCEPTION FOR NEAR-FIELD OBJECTS IN VIRTUAL ENVIRONMENTS

(71) Applicant: MICROSOFT TECHNOLOGY LICENSING, LLC, Redmond, WA (US)

(72) Inventor: Patrick W. J. Evans, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 148 days.

(21) Appl. No.: 15/194,827

(22) Filed: Jun. 28, 2016

(65) Prior Publication Data

US 2017/0372516 A1    Dec. 28, 2017

(51) Int. Cl.
*G02B 27/01* (2006.01)
*G06T 15/20* (2011.01)
(Continued)

(52) U.S. Cl.
CPC .......... *G06T 19/003* (2013.01); *G02B 27/017* (2013.01); *G06T 7/593* (2017.01);
(Continued)

(58) Field of Classification Search
CPC ................. G06T 19/003; G06T 7/0075; G06T 2219/004
See application file for complete search history.

(56) References Cited

U.S. PATENT DOCUMENTS

| 6,335,731 B1 | 1/2002 | Yamamoto |
| 7,479,967 B2 | 1/2009 | Bachelder et al. |

(Continued)

FOREIGN PATENT DOCUMENTS

| EP | 1235439 A2 | 8/2002 |
| WO | 1997008659 A1 | 3/1997 |

(Continued)

OTHER PUBLICATIONS

Jones, et al., "Peripheral Stimulation and its Effect on Perceived Spatial Scale in Virtual Environments", In Proceedings of IEEE Transactions on Visualization & Computer Graphics, vol. 19, Issue No. 04, Apr. 2013, 10 pages.

(Continued)

*Primary Examiner* — Samantha (Yuehan) Wang
*Assistant Examiner* — Khoa Vu
(74) *Attorney, Agent, or Firm* — Alleman Hall Creasman & Tuttle LLP

(57) ABSTRACT

In various embodiments, computerized methods and systems for rendering near-field objects as perceivable far-field objects within a virtual environment are provided. A determination is made that a near-field object to be rendered is configured for far-field perception within the virtual environment. The virtual environment is operable to include one or more virtualized near-field objects that are stereoscopically rendered utilizing one or more stereoscopic projection transforms generated based at least in part on a position and orientation of a head-mounted display. A harmonize transform is generated for the configured near-field object based at least in part on one of the stereoscopic projection transforms. Based on the determination that the near-field object is configured for far-field perception, the generated harmonize transform is employed to stereoscopically render the configured near-field object as a perceivable far-field object within the virtual environment.

18 Claims, 12 Drawing Sheets

(51) Int. Cl.
*G06T 19/00* (2011.01)
*G06T 7/593* (2017.01)
*H04N 13/128* (2018.01)
*H04N 13/279* (2018.01)
*H04N 13/344* (2018.01)

(52) U.S. Cl.
CPC ............ *G06T 15/20* (2013.01); *G06T 19/006* (2013.01); *H04N 13/128* (2018.05); *H04N 13/279* (2018.05); *G02B 2027/014* (2013.01); *G02B 2027/0134* (2013.01); *G06T 2219/004* (2013.01); *H04N 13/344* (2018.05)

(56) References Cited

U.S. PATENT DOCUMENTS

| | | | |
|---|---|---|---|
| 8,040,361 | B2 | 10/2011 | Bachelder et al. |
| 8,629,868 | B1 | 1/2014 | Gardiner et al. |
| 9,024,875 | B2 | 5/2015 | Seol et al. |
| 2008/0165181 | A1 | 7/2008 | Wang et al. |
| 2009/0102915 | A1* | 4/2009 | Arsenich ............... G02B 5/10 348/53 |
| 2010/0245387 | A1* | 9/2010 | Bachelder ............ G06T 19/006 345/633 |
| 2011/0018863 | A1* | 1/2011 | Ha ..................... H04N 13/0275 345/419 |
| 2011/0210966 | A1 | 9/2011 | Lee |
| 2011/0221866 | A1* | 9/2011 | Ohta ..................... G06F 1/1637 348/46 |
| 2012/0032951 | A1 | 2/2012 | Lee et al. |
| 2012/0268499 | A1* | 10/2012 | Izumi .................. H04N 13/026 345/682 |
| 2014/0132601 | A1 | 5/2014 | Raghoebardayal et al. |
| 2014/0314147 | A1* | 10/2014 | Rusanovskyy ....... H04N 19/597 375/240.12 |
| 2015/0235430 | A1 | 8/2015 | Schowengerdt et al. |
| 2015/0243099 | A1 | 8/2015 | Schowengerdt |
| 2015/0245016 | A1* | 8/2015 | Atac .................. G02B 27/0172 348/47 |
| 2015/0363976 | A1 | 12/2015 | Henson |
| 2016/0048988 | A1* | 2/2016 | Lee ........................ G06T 11/60 345/629 |
| 2016/0086379 | A1* | 3/2016 | Sadi ..................... G06T 19/006 345/633 |
| 2016/0284129 | A1* | 9/2016 | Nishizawa ............. G06F 3/013 |
| 2017/0132845 | A1* | 5/2017 | Everman, II ......... G06T 19/20 |
| 2017/0180712 | A1* | 6/2017 | Ohashi ................... G02B 27/02 |

FOREIGN PATENT DOCUMENTS

| | | |
|---|---|---|
| WO | 2010151044 A2 | 12/2010 |
| WO | 2013088390 A1 | 6/2013 |

OTHER PUBLICATIONS

Brettle, et al., "Stereo Rendering: An Overview", In Technical Report CS-2005-02, Jan. 1, 2005, 7 Pages.

"International Search Report and Written Opinion Issued in PCT Application No. PCT/US2017/036936", dated Sep. 4, 2017, 16 Pages.

Stoev, et al., "Accelerated Rendering in Stereo-Based Projections", In Proceedings of the Third International Conference on Collaborative Virtual Environments, Sep. 1, 2000, pp. 213-214.

* cited by examiner

INFINITE FAR-FIELD DEPTH PERCEPTION FOR NEAR-FIELD OBJECTS IN VIRTUAL ENVIRONMENTS

BACKGROUND

Various techniques are available to provide enhanced realism and improved user experience in computer-generated three-dimensional environments. Traditional techniques have employed the use of skyboxes or near-field particle systems, which can provide viewers with a false illusion of being surrounded by a real three-dimensional world. For instance, a skybox projects a series of two-dimensional textures onto faces of a geometric structure (e.g., a cuboid or sphere) that remain sufficiently distant and nearly static, relative to the viewer. Having sufficiently large coordinate distances, a variation in camera positions within the skybox can produce minimal variations in rendering perception. In this way, skyboxes can provide a false perception that distant objects have infinite or far-field depth, while other objects closer to the viewer appear to move. In essence, a viewer positioned within a properly configured skybox can falsely perceive the illusion of being surrounded by a three-dimensional world made up of perceived far-field objects when, in fact, the surrounding three-dimensional world is merely displaced by relatively small distances. Near-field particle systems can also be utilized to simulate an environment made up of many particles, such as a star system. The particles are generally positioned far enough away from a viewer so that they are perceived as being static and of infinite depth, similar to that of a skybox. With generally high computing costs associated with processing three-dimensional graphics, skyboxes and near-field particle systems have effectively enabled the rendering of far-field objects within a limited bit-depth environment, further facilitating the possibilities of processing three-dimensional graphics in real time.

With the advent of head-mounted displays, virtual and augmented reality applications now utilize advanced technologies that facilitate user visual and depth acuity to determine perceived depth with far greater accuracy than in traditional three-dimensional applications. Stereoscopic rendering, for instance, can provide an illusion of depth by rendering two slightly offset two-dimensional images for observation by each eye of the viewer. Stereo vision, positional-tracking, and head-tracking technologies further enable the viewer to easily discern objects having a false depth, as the viewer can now traverse rendered three-dimensional environments and/or view the virtualized objects from varying perspectives. Moreover, the viewer can now estimate and perceive distances based on visual and temporal cues facilitated by such technologies.

In order to prevent viewer discernment of the false-depth illusion, skyboxes and particle systems must rely on very large coordinate systems to simulate large distances. Unfortunately, larger coordinate systems can be computationally expensive and difficult to configure. For instance, the rendering of objects at large distances would necessitate a much larger and more detailed skybox and/or particle system. In this regard, processor demand is significantly increased as rendering computations become quantifiably more complex. As virtual and augmented reality technologies now make it easier for the viewer to discern depth, it would be highly beneficial to adopt the benefits of computationally-efficient near-field environments for augmented and virtual reality applications, such that the viewer may continue to experience the false illusion that a near-field object is of infinite or far-field depth.

SUMMARY

Embodiments described herein provide methods and systems for rendering near-field objects as perceivable far-field objects within a virtual environment. More specifically, a near-field object to-be rendered in a virtual environment is analyzed to determine whether it is configured for far-field perception. In essence, a determination is made, prior to rendering, that the near-field object is programmatically tagged or identifiable as a near-field object that is to-be-perceived as a far-field object within the virtual environment.

For the object determined to be configured for far-field perception, at least one harmonize transform is generated based at least in part on a left and/or right stereoscopic projection transform associated with the object. The left and right stereoscopic projection transforms may each include transformation matrices for rendering two-dimensional projections of an object for observation by each eye of the viewer. The at least one harmonize transform can be generated by replicating one of the left or right ocular rendering transforms, or by performing an operation (e.g., calculating a common average transform) utilizing at least a portion of one of the left or right ocular rendering transforms. The generated at least one harmonized transform is employed to stereoscopically render the object for far-field perception in the virtual environment. In essence, the stereoscopic rendering of the near-field object with the generated at least one harmonize transform prevents left and right ocular bias, providing the viewer with a false illusion that the near-field object is of infinite or far-field depth, despite any changes in viewing perspective.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1A:
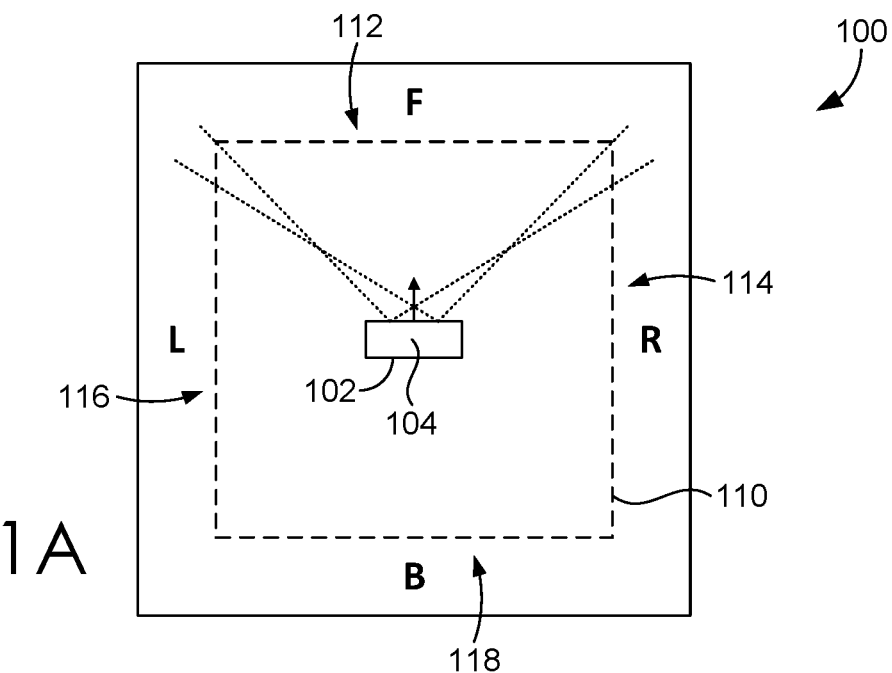
FIGS. 1A-1D are schematics showing an exemplary virtual reality device environment and a head-mounted display unit having a far field perception harmonizing component, in accordance with embodiments of the present invention.
Figure 1B:
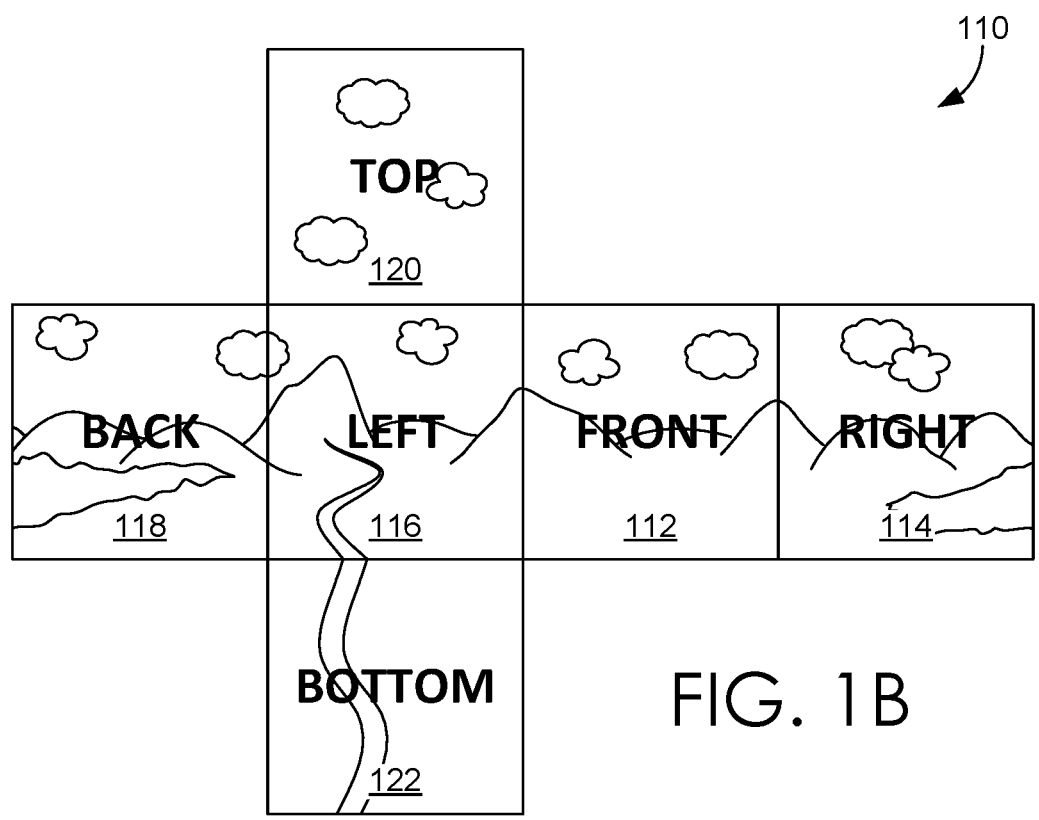
Figure 1C:
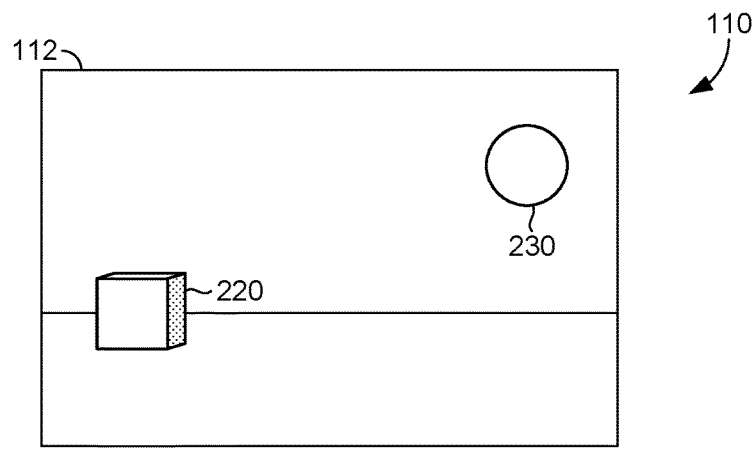

Traditional three-dimensional environments are based on near-field environments, which may include skyboxes or near-field particle systems that can provide viewers with a false perception that near-field objects have infinite depth. By way of example, near-field objects portrayed on a skybox may include rendered objects, such as the stars, sun, moon, and other distant structures that appear to be unreachable or infinitely far away from the user. In actuality, the skybox is rendered around the viewer, such that the viewer effectively remains relatively close to its center despite movements within the physical environment. The near-field objects (e.g., the stars, sun, moon, etc.) are typically rendered at a distance away from the viewer to provide the illusion that they are at a sufficient near-field depth, such that the viewer is unable to discern whether the objects are of near or infinite depth. The skybox is employed by traditional systems because the rendering of far-field and infinite depth objects were computationally expensive and frequently introduced rendering issues that negatively impacted perceived realism.

In virtual or augmented reality environments (both referenced hereinafter as "virtual environments"), a viewer can utilize stereo vision, among other things, to experience perceived immersion within three-dimensional environments. The rendering of virtual environments is similarly bound by the processing limitations of rendering far-field and infinite depth objects. In this regard, it is still preferable to implement virtual environments with predominantly near-field depth. Virtual environments can be virtualized in virtual and augmented reality devices (both referenced hereinafter as "virtual reality devices") and provided for observation and/or navigation by the viewer (i.e., the "user") wearing the virtual reality devices. In virtual environments, however, the user can observe perceived depth in virtual objects, traverse the virtual environment, and view virtual objects within the virtual environment from various perspectives, all of which may facilitate the user's ability to discern the false depth of rendered ("virtualized") near-field objects.

In more detail, each near-field object rendered within a virtual environment can be transformed in real-time based on a virtual viewing perspective that is updated in accordance with a position and orientation of the user. For example, a virtual cube may be rendered at close depth within the virtual environment. The virtual cube may grow or shrink in size, based on the user's respective positional distance. The virtual cube may also rotate, based on the user's respective radial position. As the user rotates his head away from the cube, the cube may move laterally or may slightly rotate, to provide the perceived illusion that the user is looking away.

A virtual environment may include one or more perceivable virtual objects that are stereoscopically rendered at relatively close depths. That is, objects in the virtual environment can be rendered as two slightly varying two-dimensional images, each portraying unique perspective views that are offset from each other to fool the user into perceiving depth. Typically, the virtual reality device is implemented as a head-mounted display ("HMD") that can provide for display or project the rendered stereoscopic imagery for user observation. Stereoscopic images are rendered for observation through HMDs, such that each stereoscopically rendered image is separately observable to the user's left and right eye, and the combined observance thereof provides the user with a perceived depth of the virtualized objects portrayed in the image.

As the user changes his orientation and/or position, the HMD can be configured to detect the changes with orientation sensors (e.g., gyroscope, accelerometer, and magnetometer) and/or positional sensors (e.g., infrared lights and cameras) that can facilitate the generation of tracking data that corresponds to the changed orientation and position of the HMD. The generated tracking data is obtained to generate and/or update one or more stereoscopic projection transforms (i.e., transformation matrices) that are utilized to transform the rendering of virtualized objects rendered within the virtual environment as the HMD's orientation and/or position is adjusted. To this end, the user's virtual viewing perspective is also updated as the user changes his orientation and/or position, thereby changing the HMD's orientation and/or position, to provide an immersive and virtualized experience.

When a near-field object is included in the virtual environment for purposes of providing a background to a virtualized scene, certain virtual viewing perspectives may reveal to the user that the near-field object is not of infinite depth, but is in fact near-field. By way of example only, if a moon is projected into the perceived background of a virtual environment, it would be desirable to prevent left or right ocular biases that may reveal the false depth of the moon as the user moves forward, laterally, or radially, respectively. As objects are virtualized in virtual environments at a particular target location (typically referenced by coordinates of a Cartesian coordinate system), objects desired to be portrayed as having far-field depth are actually located at a limited depth. As such, it would be desirable to keep the moon at perceived infinite depth, so that the limited depth of the moon cannot be revealed regardless of where the user traverses within the virtual environment. A virtual backdrop (e.g., a skybox) in accordance with the prior art, including one or more virtualized near-field objects, may be ineffective in falsely portraying a three-dimensional world, as users in virtual environments may perceive the virtualized objects from certain viewing perspectives that may spoil the far-field illusion.

Embodiments of the present disclosure provide systems and methods for rendering near-field objects to be perceivable as far-field objects within virtual environments. In various embodiments, a developer of the virtual environment may configure or designate certain renderable near-field objects to appear as far-field objects when rendered and transformed within the virtual environment. For instance, the developer can tag the objects or assign a depth value to the objects that fall within a predetermined range of "far-field depth" values (e.g., if depth value "z"<−500). Prior to the rendering of any near-field object, and in response to receiving an instruction to render the near-field object, the near-field object can be analyzed to determine whether it is configured (e.g., tagged or defined) for far-field perception. When the determination is made that the near-field object is configured for far-field perception, one or more harmonize transforms can be generated for the "configured" object, such that it is rendered and transformable for far-field perception within the virtual environment.

The one or more harmonize transforms can be generated by performing an operation (e.g., average, transform, translate, or duplicate) to at least one of the stereoscopic projection transforms associated with the configured object. The generated one or more harmonize transforms, instead of the associated at least one stereoscopic projection transform, can be utilized to stereoscopically render the configured object for far-field perception within the virtual environment. In this way, regardless of the virtual viewing perspective within the virtual environment, the configured object will remain perceivable as a far-field object. For example, a moon that is rendered in a virtual environment may be discernable as a near-field object as the user approaches the moon or walks around the moon. Prior to rendering, however, if the moon is determined to be tagged as a far-field object, various operations described herein may alter how the moon is ultimately rendered so that the moon remains perceivable as a far-field object.

With reference to FIGS. 1-6, embodiments of the present disclosure can be explained in more detail, using examples, with reference to a user 102 associated with a virtual reality device that is a head mounted device (HMD) 104. In FIG. 1A, an exemplary operating environment 100 is shown along with the HMD 104. The HMD, or components coupled thereto, can project a virtual environment 110 for enabling the user 102 to experience an immersive virtual experience. With brief reference to FIG. 1B, the virtual environment 110 observed by the user 102 can have a front view 112, a right view 114, a left view 116, a back view 118, a top view 120, and a bottom view 122. The exemplary virtual environment 110 can be equated to a skybox and/or a near-field particle system, in accordance with embodiments described herein. While the virtual environment 110 is portrayed in FIG. 1B as a cuboid, it is contemplated that the rendered virtual environment 110 can also be spherical, semi-spherical, or can comprise any other three-dimensional framework in which an immersive environment may be rendered. With brief reference to FIG. 1C, an exemplary front view 112 of the virtual environment 110 as can be observed through HMD 104 is provided. Rendered within virtual environment 110 and visible via the front view 112 are near-field virtual objects representing a cube 220 and a moon 230, which will be the subject of examples described in more detail herein with reference to FIGS. 2-6.

Figure 1D:
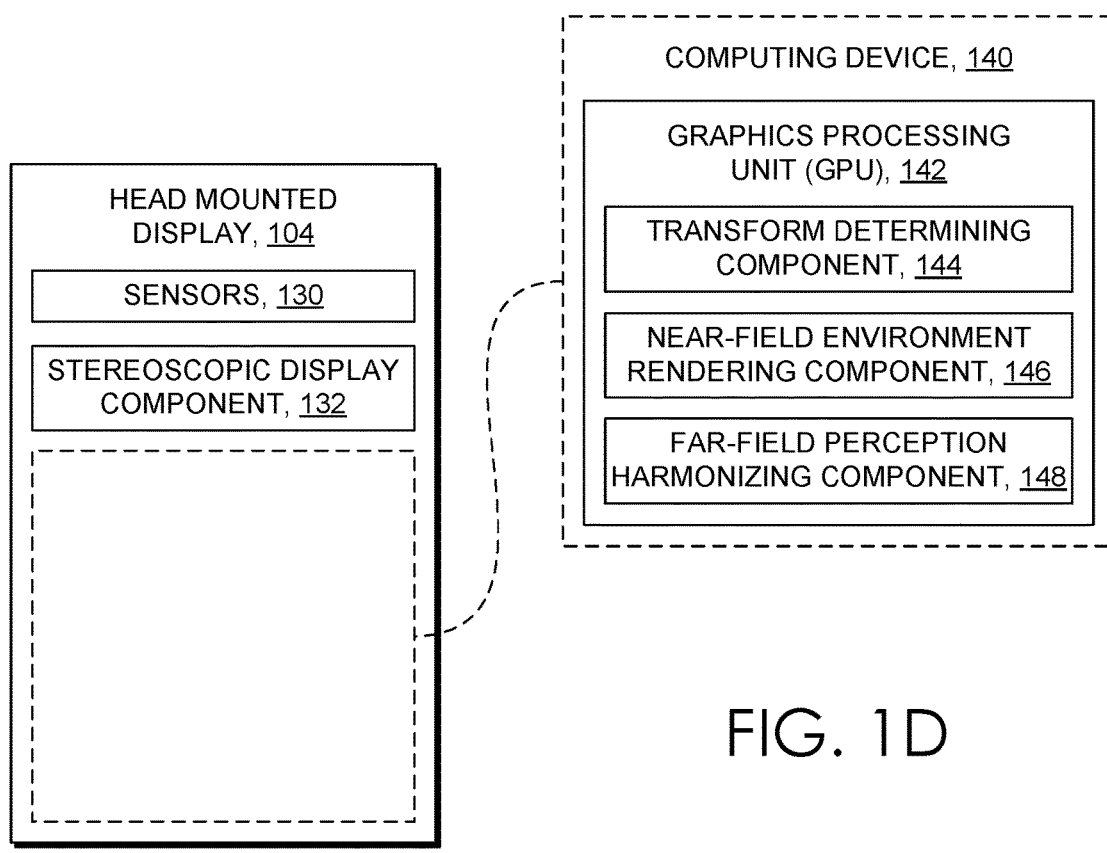

With reference now to FIG. 1D, the HMD 104 can include several components (e.g., sensors 130, a stereoscopic display component 132, and/or a computing component or computing device 140). In some embodiments, the HMD 104 can also include a forward-facing camera (not shown). A component as used herein refers to any device, process, or service, or combination thereof. A component may be implemented using hardware, software, firmware, a special-purpose device, or any combination thereof. A component may be integrated into a single device or it may be distributed over multiple devices. The various aspects of a component may be co-located or distributed. The component may be formed from other components and aspects thereof.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In various embodiments, the sensors 130, stereoscopic display component 132, and/or forward facing camera can be integrated into the HMD 104, integrated into the computing device 140, or at least integrated in part with each the HMD 104 and computing device 140. Similarly, the computing device 140 can be integrated within the HMD 104, coupled to the HMD 104, or inserted into the HMD 104. In any configuration, the HMD 104 can employ sensors 130 to determine a position and/or orientation of the user 102, employ stereoscopic display component 132 to display or project a stereoscopic rendering of a virtual environment 110 for observation by the user 102, employ a graphics processing unit (GPU) 142 of the computing device 140, employ a forward-facing camera to receive digital information from the physical environment to augment the virtual environment 110, or any combination of the foregoing.

As will be described in more detail below, the GPU 142 can include, among other things, a transform determining component 144, a near-field environment rendering component 146, and a far-field perception harmonizing component 148, for rendering near-field objects as perceivable far-field objects within the virtual environment 110. In accordance with embodiments described herein, it is contemplated that the aforementioned GPU components can be implemented in any one or more portions of the rendering pipeline. For instance, any one of the GPU components may be implemented at least in part within the pixel shader, the vertex shader, the geometry shader, and/or the tessellation shader.

As was briefly described above, the sensors 130 can include orientation sensors (e.g., gyroscope, accelerometer, and magnetometer) and/or positional sensors (e.g., infrared lights, infrared cameras, motion sensors, light sensors, 3D scanners, CMOS sensors, etc.) that can facilitate the generation of tracking data corresponding to the orientation and position of the HMD 104, or in other words, corresponding to the virtual viewing perspective of the user 102. The generated tracking data can be obtained by the transform determining component 144 to generate and/or update the stereoscopic projection transform(s) (i.e., transformation matrices) that can be utilized by the near-field environment rendering component 146 to render and/or transform the rendering of virtualized objects based on the HMD's 104 orientation or position, and detected changes thereof. In other words, each virtual object in the virtual environment can be rendered and transformed in position, size, shape, or angle, in accordance with the virtual viewing perspective of the user 102, and transformed in real-time based on the stereoscopic projection transform(s) provided by and continuously updated by the transform determining component 144 to ensure that the correct virtual viewing perspective of the virtual object is maintained in accordance with the HMD 104 position and orientation.

The near-field environment rendering component 146 can also include an operation for determining whether one or more virtual objects to-be-rendered within the virtual environment is configured for far-field perception. That is, each virtual object that is about to be rendered can be analyzed to determine whether the object has been designated to be perceived by the user 102 as an object of infinite or far-field depth.

In various embodiments, it is contemplated that a developer or designer of the virtual environment has configured a virtual object for far-field perception by tagging the virtual object or assigning a particular depth value to the virtual object. By way of example only, a virtual object can be configured or "tagged" for far-field perception by assigning a particular bit value, variable, or other identifier to the object, so that the near-field environment rendering component 146 can determine, based on identification of the particular value, variable, or identifier, that the object has been configured for far-field perception.

In another example, a virtual object can be configured or "tagged" for far-field perception by assigning the virtual object a particular depth value that falls within a predefined range. In this way, the near-field environment rendering component 146 can determine that the object's assigned depth value either exceeds a particular threshold depth value or falls within the predefined range to determine that the object has been configured for far-field perception. By way of example, if a threshold depth value is set to "z<−500", and an object is assigned for rendering at a depth value of "z=−600", the near-field environment rendering component 146 can determine that the object has been configured or tagged for far-field perception.

When the near-field environment rendering component 146 makes the determination that an object to-be-rendered is configured for far-field perception, the far-field perception harmonizing component 148 is employed to generate at least one harmonize transform for use by the near-field environment rendering component 146 when rendering the configured object. When the configured object is rendered by the near-field environment rendering component 146, utilizing the at least one generated harmonize transform, left and right ocular bias of the object is prevented so that the virtualized object's false depth can never revealed to the user 102.

Figure 2A:
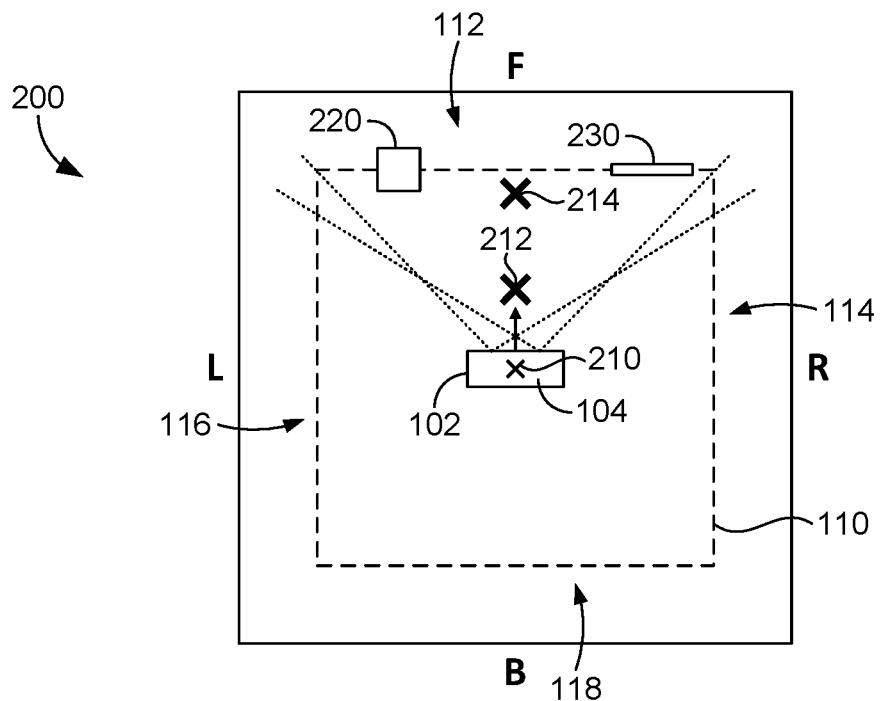
FIGS. 2A-2B are schematics of exemplary implementations of rendering near-field objects as perceivable far-field objects, in accordance with embodiments of the present invention.

In FIG. 2A, the user 102 wearing HMD 104 is standing in physical area 200. While area 200 is illustrated as a square-shaped area in the provided figures, it is contemplated that area 200 can be any physical area in which user 102 wearing HMD 104 can adjust his position and/or orientation to adjust his virtual viewing perspective within the virtual environment 110. The user 102 wearing HMD 104 is facing the front view 112 of the virtual environment 110, as was illustrated in FIG. 1C. As the user 102 wearing HMD 104 is currently located at position 210 of physical area 200, for purposes of this example, the user 102 is also virtually located at position marker 210 of virtual environment 110 and is observing the virtual viewing perspective illustrated in FIG. 2B.

Figure 2B:
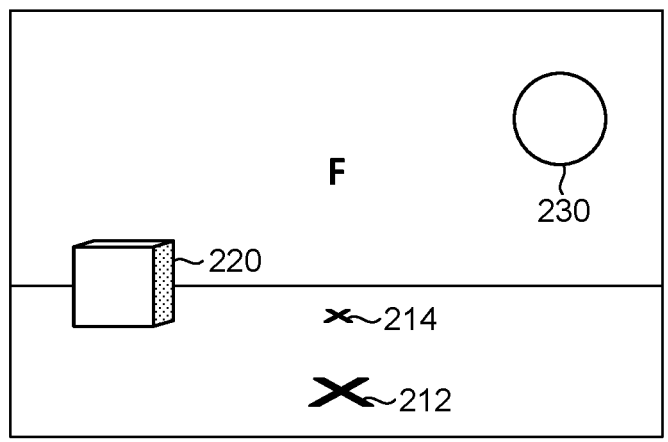

In FIG. 2B, the user 102 wearing HMD 104 and positioned at position marker 210 can observe the virtualized cube 220 and moon 230. Also illustrated in the virtual environment 110 are position markers 212 and 214, as will be described in reference to FIGS. 3-6. The virtualized cube 220 and moon 230 are stereoscopically rendered so that the user 102 can observe, via the HMD 104, the cube 220 and moon 230 as having a particular depth from the user 102 standing at position marker 210. In each of the following examples, the cube 220 and moon 230 are both near-field objects. For purposes of explaining the present disclosure in more detail using the following examples, it is assumed that the cube 220 is desired (e.g., by a developer) to be perceived as a near-field object, while the moon 230 is desired to be perceived as an object having infinite or far-field depth, and is thus configured for far-field perception.

Figure 3A:
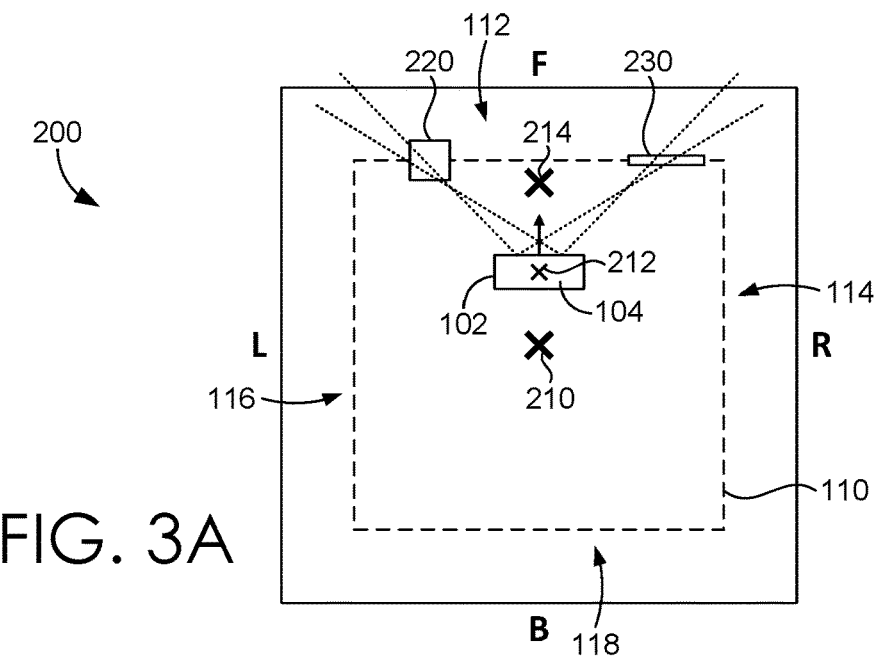
FIGS. 3A-3C are schematics of exemplary implementations of rendering near-field objects as perceivable far-field objects, in accordance with embodiments of the present invention.

Looking now to FIG. 3A, the user 102 wearing HMD 104 is again standing in physical area 200, and is again facing and observing the front view 112 of the virtual environment 110. Here, the user 102 wearing HMD 104 is physically located at position marker 212 of physical area 200. To this end, the user 102 is also virtually located at position marker 212 of virtual environment 110 and can observe the virtual viewing perspective rendered therefrom.

Figure 3B:
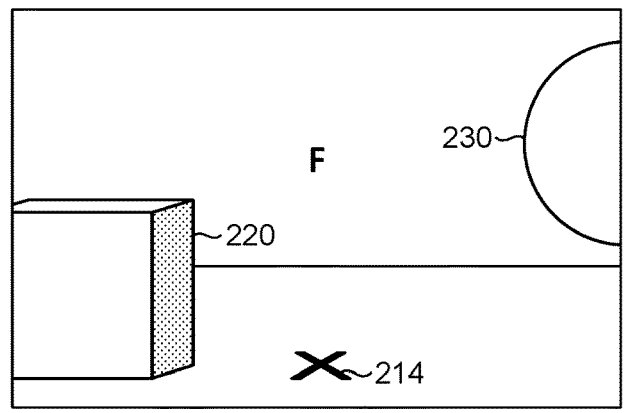

FIG. 3B illustrates how the prior art may render cube 220 and moon 230 when the user 102 is physically and virtually located at position marker 212. In more detail, and in accordance with the prior art, the user 102 wearing HMD 104 and positioned at position marker 212 can observe the virtualized cube 220 and moon 230 at a lesser depth than at position marker 210. Because user 102 wearing HMD 104 can actually traverse the virtual environment, the rendering characteristics of the virtualized objects may change based on the position and orientation of the HMD 104. Here, the distance from the user 102 to the virtualized cube 220 and moon 230 was decreased based on the forward movement of the user 102 and HMD 104. As sensors in the HMD 104, for instance sensors 130 of FIG. 1D, detected changes in the position and/or orientation of the HMD 104, stereoscopic projection transforms (i.e., the left and right ocular projection transformation matrices) associated with both the cube 220 and moon 230 were updated by components of the GPU (for instance, transform determining component 144 of FIG. 1D) to reflect at least the forward movement from position marker 210 to position marker 212. To this end, the cube 220 and moon 230 were transformed, resulting in the enlargement of the virtualized cube 220 and moon 230 for perceived virtual movement by the user 102.

This effect, however, is undesirable, as the prior art generally does not take into account the changing virtual viewing perspectives of the user 102, particularly for objects such as the moon 230, which should be perceived as having infinite or far-field depth. As such, embodiments described herein can determine whether near-field objects, such as the moon 230, are configured (e.g., by a developer) for far-field perception. For instance, embodiments can determine whether near-field objects to-be-rendered are tagged as far-field objects or are assigned a depth value that may fall within a range of depth values identifiable as far-field objects. Moreover, embodiments can further equalize or "harmonize" the stereoscopic projection transforms corresponding to each of the left and right stereoscopic displays or projections, based on this determination, so that near-field objects configured for far-field perception (e.g., the moon 230) are always perceived as having infinite or far-field depth.

Figure 3C:
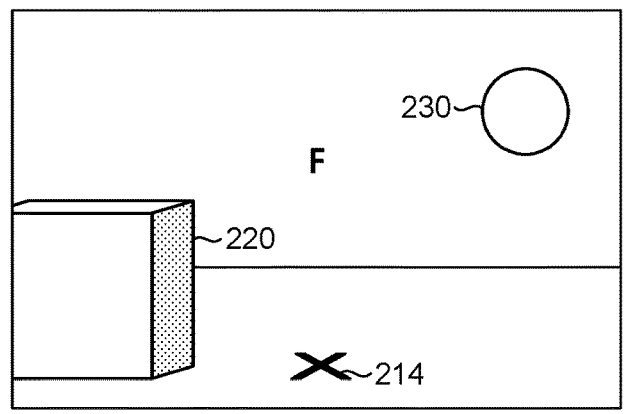

By way of example, FIG. 3C illustrates the proper virtual viewing perspective of the scene rendered in accordance with embodiments described herein, and in accordance with the scenario illustrated in FIG. 3A. The virtual viewing perspective of FIG. 3C illustrates the cube 220 and moon 230 that is rendered by a GPU configured in accordance with embodiments described herein. The size of the cube 220 was increased, as expected, as the user 102 approached and came upon position marker 212. The size and position of the moon 230, however, remained perceivably fixed, maintaining the false illusion that the moon 230 is an object of infinite depth.

Figure 4A:
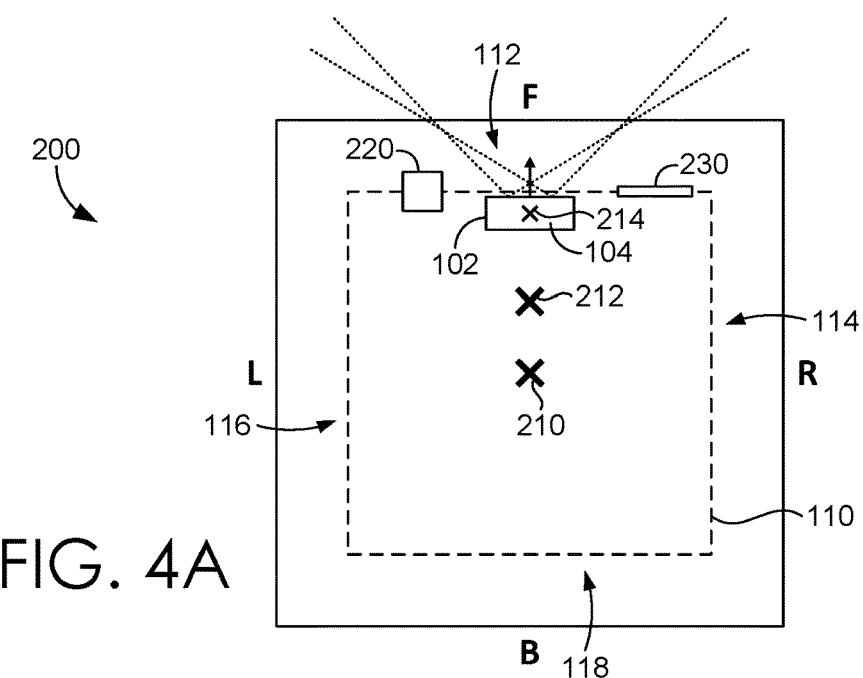
FIGS. 4A-4C are schematics of exemplary implementations of rendering near-field objects as perceivable far-field objects, in accordance with embodiments of the present invention.

Moving now to FIG. 4A, the user 102 wearing HMD 104 is again standing in physical area 200, and is again facing and observing the front view 112 of the virtual environment 110. Here, the user 102 wearing HMD 104 is physically located at position marker 214 of physical area 200. To this end, the user 102 is also virtually located at position marker 214 of virtual environment 110 and can observe the virtual viewing perspective rendered therefrom.

Figure 4B:
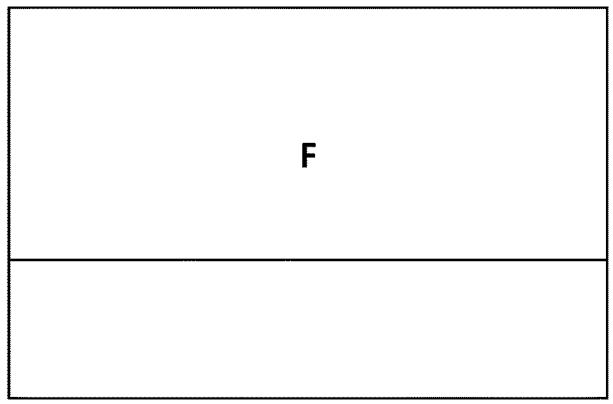

FIG. 4B illustrates how the prior art may render the virtual viewing perspective when the user 102 is physically and virtually located at position marker 214. In more detail, and in accordance with the prior art, the user 102 wearing HMD 104 and positioned at position marker 214 cannot view the virtualized cube 220 and moon 230 when positioned at a depth that is substantially equal to or greater than the objects when facing towards the front view 112. Here, based on the forward movement of the user 102 and HMD 104, the user 102 essentially passed or came upon a depth at which the virtualized cube 220 and moon 230 were rendered. As sensors in the HMD 104 (for instance, sensors 130 of FIG. 1D) detected changes in the position and/or orientation of the HMD 104, one or more stereoscopic projection transforms (e.g., the left and right ocular projection transformation matrices) associated with both the cube 220 and moon 230 were updated by components of the GPU to reflect at least the forward movement from position marker 212 to position marker 214. To this end, the cube 220 and moon 230 were transformed, resulting in the continued enlargement of the virtualized cube 220 and moon 230 for perceived virtual movement by the user 102. As the user 102 approached position marker 212 (i.e., the approximate depth at which cube 220 and moon 230 were positioned), the cube 220 and moon 230 eventually disappeared from the user's 102 field of view.

The effect is again undesirable, as the prior art once again does not take into account the changing virtual viewing perspectives of the user 102. As such, and in accordance with embodiments described herein, near-field objects such as the moon 230 can be preconfigured for far-field perception. Some embodiments can further harmonize the stereoscopic projection transforms corresponding to each of the left and/or right stereoscopic displays or projections of an object, based on a determination that the object is tagged for far-field perception. In this way, near-field objects configured for far-field perception, such as the moon 230, is continuously perceivable as having infinite or far-field depth.

Figure 4C:
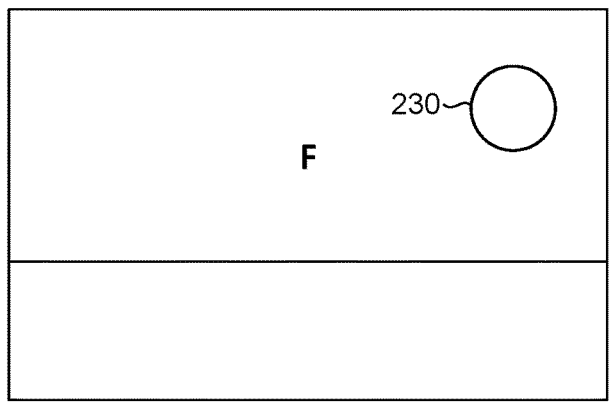

By way of example, FIG. 4C illustrates the proper virtual viewing perspective of the scene rendered in accordance with embodiments described herein, and in accordance with the scenario illustrated in FIG. 4A. The virtual viewing perspective of FIG. 4C illustrates the moon 230 that is rendered as a far-field object by a GPU configured in accordance with embodiments described herein. The size of the cube 220 was increased, as expected, until it disappeared from the user's 102 field of view upon arriving at position marker 214. The size and position of the moon 230, however, remained perceivably fixed, maintaining the false illusion that the moon 230 is an object of infinite depth.

Figure 5A:
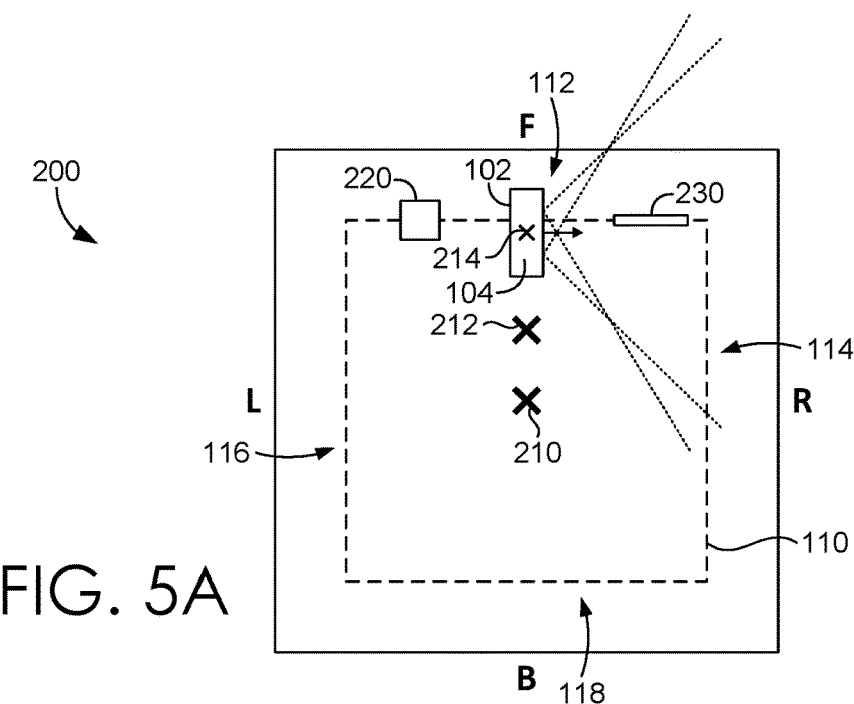
FIGS. 5A-5C are schematics of exemplary implementations of rendering near-field objects as perceivable far-field objects, in accordance with embodiments of the present invention.

Looking now to FIG. 5A, the user 102 wearing HMD 104 is standing in physical area 200, and is now facing and observing the right view 114 of the virtual environment 110. Here, the user 102 wearing HMD 104 is still physically located at position marker 214 of physical area 200. To this end, the user 102 is also virtually located at position marker 214 of virtual environment 110 and can observe the virtual viewing perspective rendered therefrom.

Figure 5B:
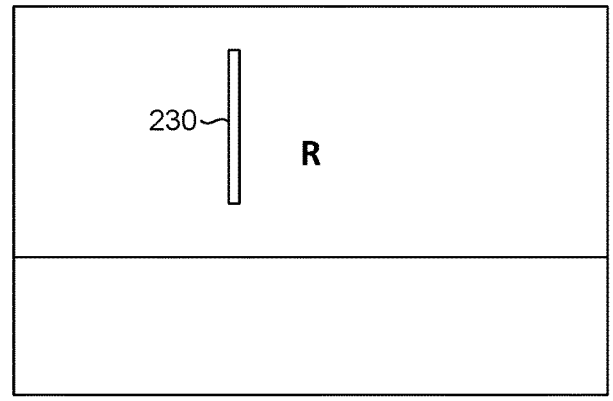

FIG. 5B illustrates how the prior art may render the virtual viewing perspective when the user 102 is physically and virtually located at position marker 214 and facing right view 114. In more detail, and in accordance with the prior art, the user 102 wearing HMD 104, positioned at position marker 214 and facing the right view 114 can view the moon 230 from the side when generally facing it and when positioned at a closer distance thereto. Here, the user 102 is viewing a lateral perspective of the moon 230, essentially revealing the side perspective of the moon object rendered at the same depth of position marker 214.

As sensors in the HMD 104 (for instance, sensors 130 of FIG. 1D) detected changes in the position and/or orientation of the HMD 104, one or more stereoscopic projection transforms (e.g., the left and right ocular projection transformation matrices) associated with both the cube 220 and moon 230 were updated by the GPU, or components thereof (such as the transform determining component 144 of FIG. 1D), to reflect at least the ninety-degree radial movement at position marker 214 towards the moon 230. To this end, the moon 230 was transformed by the GPU, or its components (such as the near-field environment rendering component 146 of FIG. 1D), resulting in the rotation of the moon 230 for perceived virtual movement by the user 102.

As the user 102 turned at position marker 214 (i.e., the approximate depth at which cube 220 and moon 230 are positioned), the moon 230 appeared into the user's 102 field of view. However, as one of ordinary skill in the art would appreciate, the user 102 was unrealistically able to travel to the depth at which the moon is rendered, and should not be able to perceive the false shape thereof. The moon 230 is portrayed herein as a flat disc for purposes of exaggerating how virtual environments can undesirably reveal the false perception of far-field objects. It is contemplated, however, that the moon 230 could have been spherical, or any shape for that matter. The possibility that the user 102 can perceive, reach, or extend past the depths of the desirable far-field object can easily take away from the perceived realism of the virtual environment.

As was described, and in accordance with embodiments described herein, near-field objects, such as the moon 230, can be preconfigured for far-field perception. Embodiments can harmonize the stereoscopic projection transforms corresponding to each of the left and right stereoscopic displays or projections of an object, based on a determination that the object is tagged for far-field perception. In this way, near-field objects configured for far-field perception, such as the moon 230, is continuously perceived as having infinite or far-field depth.

Figure 5C:
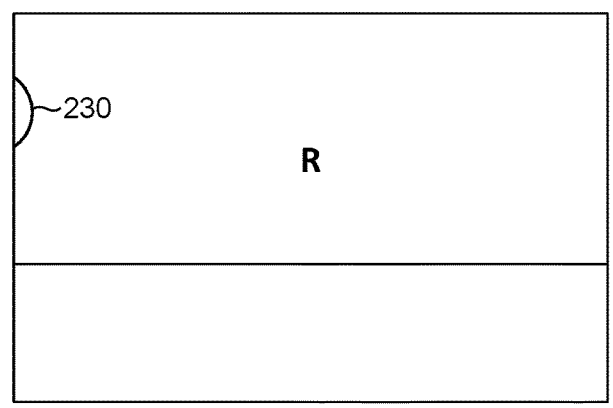

By way of example, FIG. 5C illustrates the proper virtual viewing perspective of the scene rendered in accordance with embodiments described herein, and in accordance with the scenario illustrated in FIG. 5A. The virtual viewing perspective of FIG. 5C illustrates the moon 230 that is rendered as a far-field object by a GPU configured in accordance with embodiments described herein. The cube 220 is positioned behind the user at position marker 214 and is therefore not currently visible. The size and position of the moon 230, however, remained perceivably fixed, maintaining the false illusion that the moon 230 continues to be an object of infinite depth.

Figure 6A:
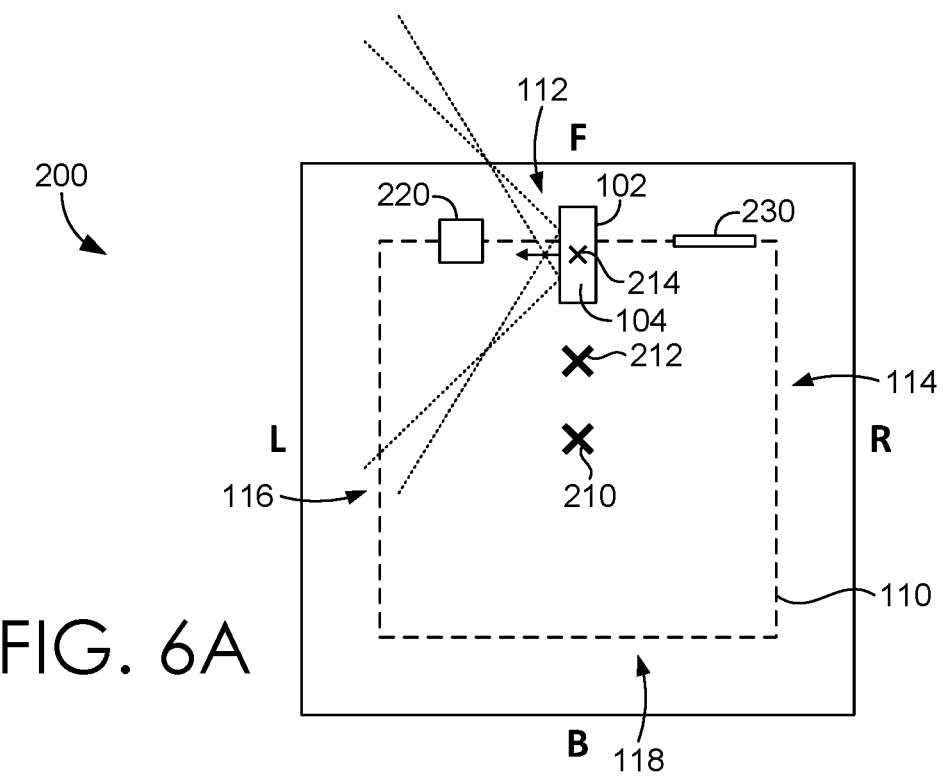
FIGS. 6A-6B are schematics of exemplary implementations of rendering near-field objects as perceivable far-field objects, in accordance with embodiments of the present invention.

Looking now to FIG. 6A, the user 102 wearing HMD 104 is standing in physical area 200, and is now turned facing and observing the left view 116 of the virtual environment 110. Here, the user 102 wearing HMD 104 is still physically located at position marker 214 of physical area 200. To this end, the user 102 is also virtually located at position marker 214 of virtual environment 110 and can observe the virtual viewing perspective rendered therefrom.

Figure 6B:
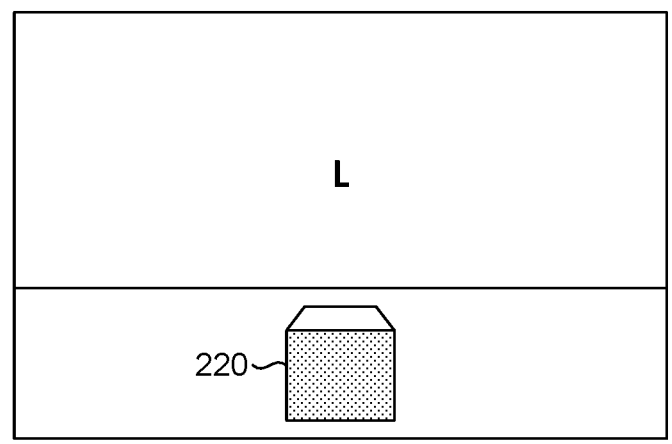

FIG. 6B illustrates how the prior art may render the virtual viewing perspective when the user 102 is physically and virtually located at position marker 214 and facing left view 116. In more detail, and in accordance with the prior art, the user 102 wearing HMD 104, positioned at position marker 214 and facing the left view 116 can view the cube 220 when facing it and when positioned at a substantially equal depth thereto. Here, the user 102 is viewing a lateral perspective of the cube 220, essentially revealing the side perspective of the cube object rendered at the same depth of position marker 214.

As sensors in the HMD 104 (for instance, sensors 130 of FIG. 1D), detected changes in the position and/or orientation of the HMD 104, one or more stereoscopic projection transforms (e.g., the left and right ocular projection transformation matrices) associated with both the cube 220 and moon 230 were updated by components of the GPU (such as the transform determining component 144 of FIG. 1D), to reflect at least the one-hundred-and-eighty-degree radial movement at position marker 214 from the moon 230 towards the cube 220. To this end, the cube 220 was transformed by components of the GPU (such as the near-field environment rendering component 146 of FIG. 1D), resulting in the rotation of the cube 220 for perceived virtual movement by the user 102.

As the user 102 turned at position marker 214 (i.e., the depth at which cube 220 and moon 230 are approximately positioned), the moon 230 disappeared from the user's 102 field of view, while the cube 220 appeared into the user's 102 field of view. Here, the user 102 has realistically traveled to the approximate depth at which the cube was rendered, and is also able to perceive the proper and desirable shape and orientation thereof from position marker 214. The cube 220 is portrayed herein from its side and enlarged based on the user's 102 sensed position and orientation.

As was described, and in accordance with embodiments described herein, some near-field objects like the moon 230 can be preconfigured to be rendered for far-field perception, while other near-field objects like the cube 220 can be simultaneously rendered within the virtual environment as near-field objects. Based on a determination that a particular near-field object is tagged for far-field perception, embodiments can harmonize the stereoscopic projection transforms associated with the particular near-field object when rendering it for display or projection to each of the left and right stereoscopic outputs. If a determination is made that the particular near-field object is not tagged for far-field perception, then it is rendered utilizing traditional methods utilizing the one or more stereoscopic projection transforms (e.g., the left and right ocular projection transformation matrices) associated therewith. In this way, near-field objects, such as the cube 220, and those configured for far-field perception, such as the moon 230, can be perceived as having near-field depth or far-field depth, respectively, within the same virtual environment.

Referencing back now to FIG. 1D, the HMD 104 includes a transform determining component 144 that can obtain tracking data generated by sensors 130. The tracking data can be generated based on various sensors that can detect, among other things, a position (e.g., x, y, and z coordinate values), an orientation, yaw, pitch, and/or roll of the HMD 104 worn by a user. By way of example, the sensors 130 may include a magnetometer for determining the absolute orientation of the HMD 104, an accelerometer for measuring changes in velocity and changes in position of the HMD 104, and a gyroscope for measuring changes in orientation or changes in rotational velocity. In various embodiments, the combined tracking data received from the sensors 130 can be analyzed to determine position and orientation of the HMD 104 with accuracy.

The transform determining component 144 can obtain the tracking data by retrieving the tracking data from the sensors 130, or receiving the tracking data sent by the sensors 130 to the computing device 140 and/or GPU 142. Once the tracking data is obtained, the transform determining component 144 is responsible for generating at least one stereoscopic projection transform. In some embodiments, a single stereoscopic projection transform can be generated, including a single transformation matrix that will transform all object vertices within a virtualized scene, so that projection and transformation of each object in the virtual environment is based on detected tracking data. In other embodiments, two stereoscopic projection transforms can be generated, including the left ocular projection transform and the right ocular projection transform. Each of the left and right ocular projection transforms can include one or more transformation matrices for moving and/or rotating vertices of objects rendered within the virtual environment based on the detected tracking data.

In some embodiments, the left and right ocular projection transforms are slightly different from one another. For example, the left ocular and right ocular projection transforms may have translation differences (e.g., across the x-axis) that are very small. More specifically, the translation differences between the left and right ocular projection transforms can be increased or decreased based on the interpupillary distance (IPD) of the user. As each of the user's eyes is supposed to observe the virtual environment from a rendered camera position corresponding to the left and right eye in order to provide the proper virtual reality effect, the position of objects within the virtual environment must correspond to the user's IPD.

In embodiments in accordance with the provided disclosure, the stereoscopic projection transform(s) can manipulate the virtual viewing perspective of the virtual environment by moving and/or rotating, among other things, the vertices of objects rendered within a particular virtual scene or environment as the HMD 104 is displaced. For any particular object, the transform determining component 144 can generate stereoscopic projection transform(s) for association with an object to-be-rendered, so that the object to-be-rendered is properly transformed in accordance with the position and orientation of the user wearing HMD 104.

Embodiments in accordance with the present disclosure can be explained in further detail with reference to FIG. 7A. Here, the user 102 is wearing HMD 104 and is standing in physical area 200 while facing and observing the front view 112 of the virtual environment 110. The user 102 wearing HMD 104 is located at position marker 210 of physical area 200. To this end, the user 102 is also virtually located at position marker 210 of virtual environment 110 and can observe the virtual viewing perspective rendered therefrom. In this example, the virtualized cube 220 is rendered at position marker 212, while the virtualized moon 230 is rendered at position marker 214. FIG. 7B provides a camera preview 710 that illustrates an exemplary two-dimensional preview of what the user 102 wearing HMD 104 may see in the provided configuration of FIG. 7A.

Figure 7A:
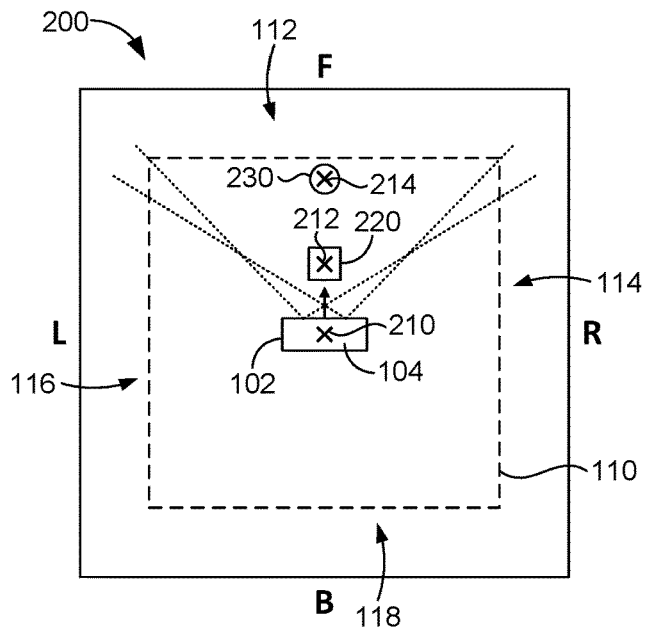
FIGS. 7A-7D are schematics of exemplary implementations of rendering near-field objects as perceivable far-field objects, in accordance with embodiments of the present invention.
Figure 7B:
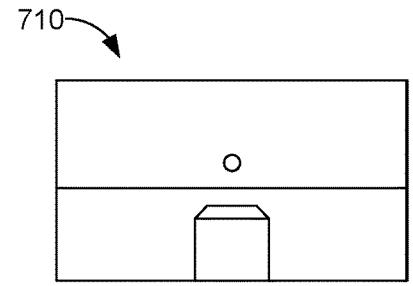
Figure 7C:
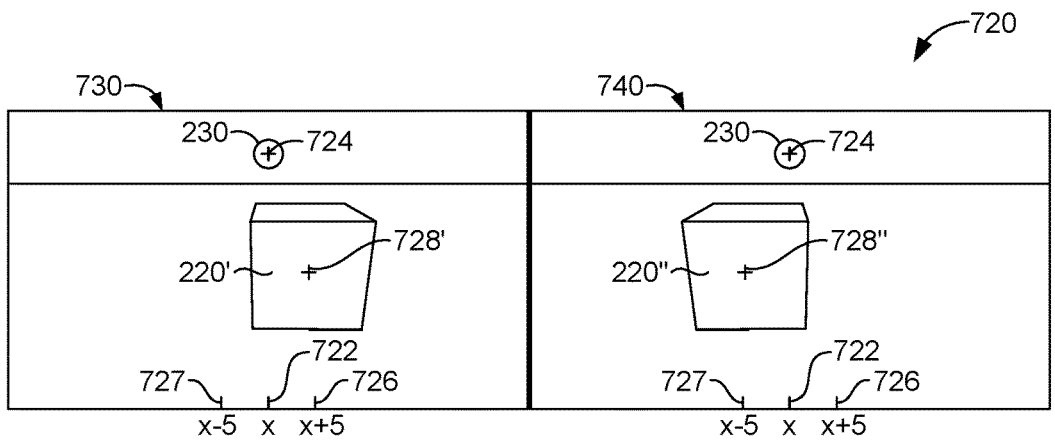

FIG. 7C illustrates how some embodiments in accordance with the present disclosure may stereoscopically render near-field objects as perceivable far-field objects within a virtual environment. FIG. 7C illustrates an exemplary stereoscopic view 720 (comprising the left ocular view 730 and right ocular view 740) when the user 102 is physically and virtually located at position marker 210, the virtualized cube 220 of FIG. 7A is at position marker 212, and the virtualized moon 230 is at position marker 214. For purposes of this example, it is assumed that while both objects are near-field objects, the moon 230 is configured or tagged as a far-field object.

In the provided illustration, the stereoscopic view 720 shows how the virtualized cube 220 and moon 230 of FIG. 7A, among other things, are rendered in accordance with embodiments described herein. In general, near-field objects for the left ocular view 730 portion of the stereoscopic view 720 are rendered based on a left ocular projection transform, while the same objects for the right ocular view 740 portion of the stereoscopic view 720 are rendered based on a right ocular projection transform. As can be seen, the virtualized moon 230, tagged for far-field perception, appears to remain relatively static in its rendered position, regardless of the perspective (e.g., left view 730, right view 740) from which it is being viewed. The virtualized cube 220, however, appears to shift positions based on the perspective (e.g., the left or right ocular positions) from which it is being viewed.

Looking at the left ocular view 730 portion of the stereoscopic view 720 in more detail, the moon center 724 is horizontally aligned with translational reference point 722 represented as variable "x", while the cube center 728' is offset to the right of translational reference point 722 and aligned with another translational reference point 726 represented here as variable "x+5". Here, the virtualized cube 220' is rendered offset to the right because the corresponding left ocular projection transform includes translational value(s) that render the virtualized cube 220' as it would appear from the perspective of the user's left eye. It is contemplated that the value of "x+5", while merely used here as an example, could be replaced with a value that is based in part on the user's IPD, among other things.

On the other hand, the right ocular view 740 portion of the stereoscopic view 720 shows how the virtualized cube 220 and moon 230 of FIG. 7A, among other things, are rendered based on a right ocular projection transform. Here, the moon center 724 is still aligned with translational reference point 722, while the cube center 728" is offset to the left of translational reference point 722 and aligned with another translational reference point 727 represented as variable "x−5". Here, the virtualized cube 220" is rendered offset to the left because the corresponding right ocular projection transform includes translational value(s) that render the virtualized cube 220" as it would appear from the perspective of the user's right eye. It is contemplated that the value of "x−5", while merely used here as an example, could be replaced with a value that is based in part on the user's IPD, among other things.

Figure 7D:
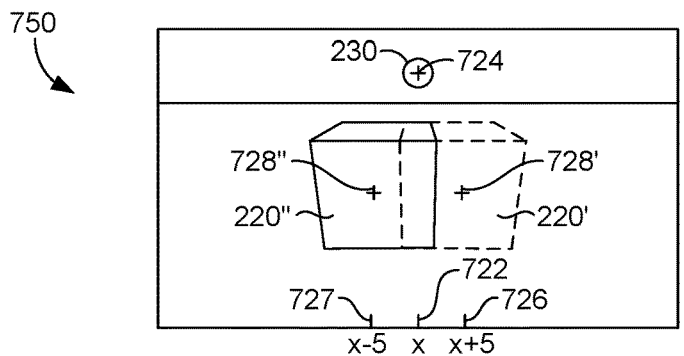

FIG. 7D represents a partially transparent view of the right ocular view 740 as an overlay on the left ocular view 730, or vice versa. The illustration provided here merely serves as a demonstration to easily portray the left and right ocular biases for virtualized objects that are generally rendered as a result of stereoscopic projection transforms, and the rendered invariance facilitated by embodiments described herein. It is obvious here, that the virtualized cube 220', 220" having respective centers 728', 728" dramatically shifts in rendered positions based on the respective ocular projection transform (e.g., left or right) with which it was rendered.

As noted herein, the stereoscopic projection transform(s) provide rendering data for an object that, when stereoscopically rendered therewith, can provide perceivable depth, among other things, to a virtualized object. As also noted, each rendered perspective viewed by the user's left and right eyes, respectively, can give the illusion of depth to a virtualized object. Here, the cube 220', 220" is stereoscopically rendered as a typical near-field object and, as a result, demonstrates at least a translational shift corresponding to each viewing perspective.

More importantly, the moon 230 is configured here to be perceived as a far-field object and is stereoscopically rendered to be perceived as a far-field object. As a result, rendering of the moon 230 in accordance with embodiments described herein demonstrates no translational variation (i.e., each eye shares the same viewing perspective) between the different viewing perspectives. In this way, ocular bias for near-field objects configured for far-field perception is essentially removed to facilitate far-field perception, in accordance with embodiments described herein.

The translational reference points 722, 726, 727 each represent a translational (e.g. x-axis) value at which any one of the objects is positioned when rendered. The values utilized in these illustrations are merely exemplary and are not intended to be limiting in any way. It is contemplated that the translational values for any object in either of the left or right ocular views 730, 740 can vary based on object position (e.g., distance, height, translational position, etc.), orientation, viewing angle, distortion, user IPD, available field of view, and more. While the corresponding translational values (e.g., translational values 722, 727) of any object rendered in both left and right ocular views may be equidistant from a field of view center point (e.g., translational reference point 722), it is contemplated that the corresponding translational values do not have to be equidistant from the center point, in accordance with some embodiments.

Referencing back now to FIG. 1, the near-field environment rendering component 144 can stereoscopically render and/or transform a near-field object within a virtual environment utilizing one or more transforms (e.g., transformation matrices). Among other things, the near-field environment rendering component 144 is responsible for determining whether an object to-be-rendered, by the GPU 142 or other components thereof, is configured for far-field perception. As was described above, an object that is designed or programmed for rendering within a virtual environment can be programmatically tagged or assigned a depth value that can enable the near-field environment rendering component 144 to make a determination that the object is to be rendered for far-field perception.

Under normal circumstances, if an object is not configured for far-field perception, the near-field environment rendering component 144 can render and transform an object within the virtual environment utilizing the stereoscopic projection transform(s) generated by the transform determining component 144. As the HMD 104 is displaced within physical space, the sensors 130 provide tracking data to the transform determining component 144, which can generate stereoscopic projection transform(s) in turn, so that the near-field environment rendering component 144 can properly render and/or transform the object in accordance with the displacement of the HMD 104. In embodiments, the transforming of the object is continuously updated in real-time, as the HMD 104 is displaced and tracking data is responsively generated.

In some embodiments, when the near-field environment rendering component 144 determines that an object is configured for far-field perception, it can send a request to the far-field perception harmonizing component 148 to generate at least one harmonize transform for the configured object, based on the stereoscopic projection transform(s). In this regard, the far-field perception harmonizing component 148 can generate the harmonize transform(s) for the configured object in response to receiving the request. In other embodiments, the far-field perception harmonizing component 148 can continuously generate the harmonize transform(s) for objects to-be-rendered as tracking data is obtained. To this end, the far-field perception harmonizing component 148 can readily respond to the request with the already generated harmonize transform(s).

The far-field perception harmonizing component 148 is responsible for generating the harmonize transform(s) based on the stereoscopic projection transform(s) associated with a virtual scene or environment and/or a configured object. The far-field perception harmonizing component 148 can generate the harmonize transform(s) by performing one or more transform operations on the stereoscopic projection transform(s) associated with the virtual environment or configured object. Ultimately, the transform operation(s) performed on the stereoscopic projection transform(s) results in one or more harmonize transforms that can be used by the near-field environment rendering component 146 for rending and transforming at least the configured object within the virtual environment, to maintain the perceived illusion within the scene that the configured object has infinite or far-field depth.

The transform operation(s) can include individual and/or combined operations for averaging, translating, rotating, and/or scaling virtual objects in a virtual environment or about to be rendered in the virtual environment. The operation(s) can be performed on the entirety or at least a portion of at least one of the stereoscopic projection transform(s). For example, if two stereoscopic projection transforms (e.g., the left and right ocular projection transforms) associated with an object are analyzed for harmonization by the far-field perception harmonizing component 148, the far-field perception harmonizing component 148 can initialize a new harmonize transform (i.e., at least one transformation matrix) that is based on an average of both, or at least corresponding portions of both of the stereoscopic projection transforms. In some instances, the averaged portion may include the averaged translation values (e.g., the x values) of the left and right ocular projection transforms. In other words, each of the left and right ocular projection transforms can be translated so that the translation values for each reference a mid-point from their respective original translation values. A virtual object rendered at this mid-point would appear in the same horizontal position for both the left and right eyes. In this regard, left and right eye bias when perceiving the configured object in the virtual environment is eliminated. The generated harmonize transform can then be communicated back to the near-field environment rendering component 146 so that the configured object can be stereoscopically rendered and transformed using the generated harmonized transform, in replacement of the left and right ocular projection transforms.

In another example, if two stereoscopic projection transforms (e.g., the left and right ocular projection transforms) associated with an object are analyzed for harmonization by the far-field perception harmonizing component 148, the far-field perception harmonizing component 148 may simply generate a new harmonize transform that is a duplicate of one of the two stereoscopic projection transforms. To this end, the generated harmonize transform can be communicated back to the near-field environment rendering component 146 so that the configured object can be rendered and transformed using the generated harmonized transform for each eye. In this way, either the left or right ocular projection transforms is duplicated so that left and right eye bias is eliminated, and the object can be perceived as having infinite or far-field depth within the virtual environment.

It is also contemplated that the transform operation(s) can effectively perform various transformations, manipulations, and/or purposeful distortions to an object to-be-rendered. For instance, scaling operations can be performed on particular portions of each stereoscopic projection transform associated with an object. When combined with other operations that harmonize the object to prevent left and right eye bias, it is contemplated that various effects can be applied to objects harmonized for far-field perception within the virtual environment.

In some embodiments, and in accordance with the present disclosure, an object to-be-rendered in a virtual environment can be configured so that it is perceivable as having infinite or far-field depth only for a duration while the user or HMD 104 is separated (e.g., in virtual space) at a distance that is greater than a threshold distance (hereinafter referenced as a "far-field depth threshold") from the rendered object. In other words, the computing device 140, GPU 142, or components thereof, may determine a relative distance between the configured object and the user in virtual space. The distance between the user in virtual space and a virtualized object rendered within the virtual environment is referred to herein as a "relative viewpoint depth value." In accordance with embodiments described herein above, the user can approach a configured object (for instance, the moon 230 of FIG. 1C) in virtual space so that the size, position, or orientation of the configured object will not be affected by the position and orientation of the user wearing HMD 104, thereby maintaining the false illusion of far-field depth. However, in some situations, it may be preferable that certain objects appear to have infinite or far-field depth only until the user reaches a minimum threshold distance therefrom.

As such, further embodiments may provide an option for developers to assign a far-field depth threshold to an object configured for far-field perception. Such an assignment can be facilitated by enabling a variable that can store a value for the far-field depth threshold. Therefore, in some embodiments, the near-field environment rendering component 146 can determine that an object to-be-rendered is also "conditionally configured" for far-field perception. As the user's position in virtual space is tracked (for instance, with sensors 130 of FIG. 1D), a relative viewpoint depth value measuring a relative distance between the user and the object can be calculated for the object having an assigned far-field depth threshold. In this way, when the near-field environment rendering component 146 determines that the far-field depth threshold has been reached (e.g., the user has crossed at least the minimum threshold distance from the object), it can request one or more modified stereoscopic projection transforms from one or more components of the GPU 142 (e.g., the transform determining component 144) to associate with the object for continued rendering and transformation.

The GPU 142 or components thereof (for instance, transform determining component 144), can generate and provide new, modified stereoscopic projection transform(s) for association with the conditionally configured object. The newly generated "modified" stereoscopic projection transform(s) are still based on the obtained tracking data generated by the sensors 130, but are modified based on the detected relative viewpoint depth value of the user in virtual space. To this end, when the stereoscopic projection transform(s) for the conditionally configured object is switched from the harmonized transform(s) to the modified stereoscopic projection transform(s), the changeover should not be noticeable. In essence, the conditionally configured object will gradually change from having perceived infinite depth to having perceivable near-field depth, so that when the user reaches the far-field depth threshold, the conditionally configured object may begin to transform based at least in part on the orientation and position of the HMD 104.

By way of example only, an object depicting a skyscraper may be conditionally configured for far-field perception. Assume, for purposes of this example, that cube 220 of FIG. 2B represents the skyscraper. Also assume that each position marker 210, 212, and 214 of FIGS. 2A and 2B represents one-hundred depth units (e.g., "z" values) there between. As such, when user 102 is standing at position marker 210, he is presumably three-hundred depth units away from the skyscraper (cube 220). Assume that the skyscraper (cube 220) is conditionally configured as a far-field object having a far-field depth threshold value of minus two-hundred units (i.e., two-hundred depth units away from the user). As the user 102 approaches position marker 212 from position marker 214, the rendering of the skyscraper (cube 220) should not be transformed because it is being rendered with a harmonize transform. However, as the user 102 crosses position marker 212, the relative viewpoint depth value between the user 102 and the skyscraper (cube 220) is now within two-hundred depth units. Based on the relative viewpoint depth value exceeding (e.g., meeting, crossing, falling within) the far-field depth threshold associated with the conditionally configured object, the object is now being rendered and transformed with the modified stereoscopic projection transform(s). To this end, the skyscraper (cube 220) can begin to transform (e.g., grow in scale) as the user 102 further approaches position marker 214 in virtual space.

The modified stereoscopic projection transform(s) can be configured so that the transition between perceived infinite depth and near-field depth is not obvious or drastic. In other words, the modified stereoscopic projection transform(s) can be based on a formula that is programmatically implemented by the developer. By way of example only, the near-field environment rendering component 146 may determine that a virtualized object is to be rendered and transformed based on a modified projection transform(s) instead of the harmonized transform(s) (e.g., the far-field depth threshold value has been reached). Based on this determination, it may communicate the generated harmonized transform(s), among other things, to the transform determining component 144 so that the transform determining component 144 can generate the one or more modified stereoscopic projection transforms based at least in part on the generated harmonized transform(s).

In some embodiments, the generated modified stereoscopic projection transform(s) may initially begin rendering and transforming the object using the same transformation matrix configuration as the harmonize transform(s). However, as tracking data from the sensors 130 is obtained, indicating that the user is approaching the conditionally configured object in virtual space, the modified stereoscopic projection transform(s) can be updated based on an asymptotic curve so that the conditionally configured object doesn't appear to change from unapproachable to suddenly approachable. In essence, it is desirable to base the modified stereoscopic projection transform(s) on the asymptotic curve or variation thereof, to provide the illusion that the user 102 is gradually approaching the conditionally configured object. It is further contemplated that the far-field perception harmonizing component 148 can also generate harmonize transform(s) based on an asymptotic curve or variation thereof. In this regard, an even smoother transition can be facilitated when changing the rendering and transforming of a conditionally configured object from the harmonize transform(s) to the modified stereoscopic projection transform(s).

Figure 8:
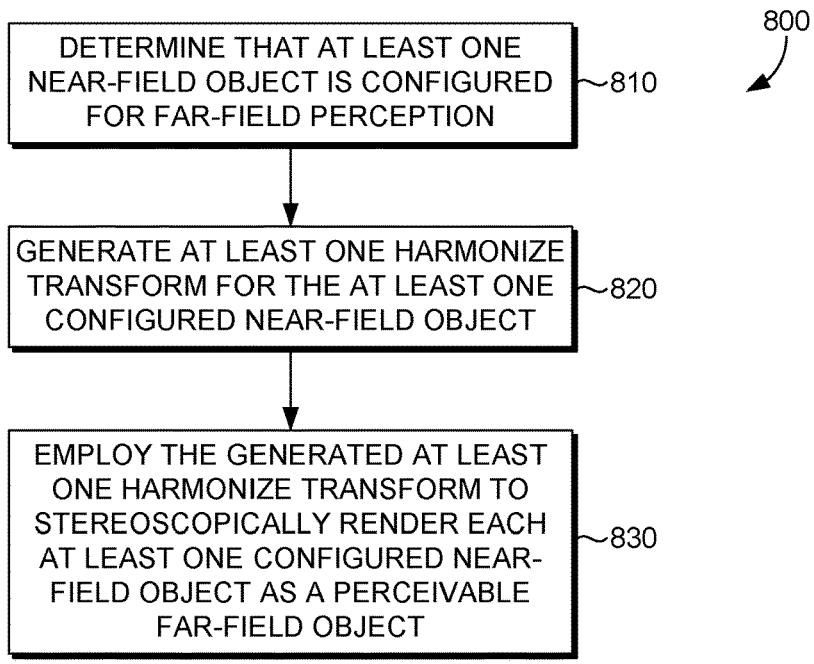
FIG. 8 is a flow diagram showing a method for rendering near-field objects as perceivable far-field objects within a virtual environment, in accordance with embodiments of the present invention.

Having described various aspects of the present disclosure, exemplary methods are described below for rendering near-field objects as perceivable far-field objects within a virtual environment. Referring to FIG. 8 in light of FIGS. 1-7, FIG. 8 is a flow diagram showing a method 800 for rendering near-field objects as perceivable far-field objects within a virtual environment. Each block of method 800 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Initially, at block 810, at least one near-field object from a plurality of renderable near-field objects is determined to be configured for far-field perception within a virtual environment. In some embodiments, the determination is made in response to receiving an instruction to stereoscopically render the at least one near-field object configured for far-field perception within the virtual environment. In further embodiments, the virtual environment can include a virtual skybox and/or near-field particle system. The determination can be made using a near-field environment rendering component that can identify a tag or depth value associated with the object(s) that corresponds with a classification of far-field perception. In other words, the tag or depth value can be the determinative factor on whether an object that is to be rendered by a GPU, or components thereof, is to be perceived as having infinite or far-field depth.

In embodiments, each of the plurality of renderable near-field objects can be stereoscopically rendered within a virtual environment based at least in part on a single stereoscopic projection transform or a pair of unique stereoscopic projection transforms (e.g., a left and right ocular projection transform). In accordance with embodiments described herein, a transform can be a transformation matrix for at least moving, rotating, and/or scaling virtual objects that are renderable within the virtual environment. In some embodiments, the stereoscopic projection transform(s) can be generated by a transform determining component. The transform determining component can generate the stereoscopic projection transform(s) based at least in part on tracking data obtained from sensors integrated in or associated with a head mounted display. In further embodiments, the transform determining component can generate the stereoscopic projection transform(s) based further in part on a formula (e.g., an asymptotic curve formula) programmatically implemented by a developer.

At block 820, at least one harmonize transform can be generated for the at least one near-field object configured for far-field perception. The harmonize transform(s) can be generated based at least in part on one of the generated stereoscopic projection transform(s). The harmonize transform(s) can be generated by a far-field perception harmonizing component that can obtain the stereoscopic projection transform(s) generated by the transform determining component. The harmonize transform(s) can be generated by performing a transform operation on at least a portion of the generated stereoscopic projection transform(s). The transform operation can include one or more of an averaging operation, a translating operation, a rotating operation, and/or a scaling operation.

At block 830, the generated at least one harmonize transform can be employed to stereoscopically render each at least one near-field object configured for far-field perception as a perceivable far-field object within the virtual environment. In other words, each near-field object configured for far-field perception can be stereoscopically rendered, by a GPU or components thereof, utilizing the generated at least one harmonize transform in replacement of the stereoscopic projection transform(s) generated by the transform determining component. In this way, each at least one near-field object configured for far-field perception can be perceivable as having infinite or far-field depth within the virtual environment because left and right ocular bias is eliminated by way of utilizing the harmonize transform(s).

In some further embodiments, a relative viewpoint depth value associated with a user can be obtained. In essence, the distance between the at least one near-field object configured for far-field perception and the user positioned in virtual space can be determined by the GPU or components thereof. The relative viewpoint depth value can be obtained by the near-field environment rendering component to make a determination as to whether it meets, exceeds, or falls within a far-field depth threshold associated with the at least one near-field object configured for far-field perception. In some embodiments, the far-field depth threshold can be programmatically assigned to each near-field object configured for far-field perception. Based on determining that the relative viewpoint depth value meets, exceeds, or falls within the far-field depth threshold associated with the at least one near-field object configured for far-field perception, at least portions of the stereoscopic projection transform(s) can be employed or utilized to stereoscopically render the at least one near-field objects. In this way, the at least one near-field object is no longer rendered and transformed based on the harmonize transform(s), but instead can be rendered and transformed based at least on a portion of the stereoscopic projection transform(s). In some embodiments, portions of the harmonize transform(s) corresponding to the size (e.g., scale ratio) of the at least one near-field object can be adjusted based on the obtained relative viewpoint depth value, to preserve size consistency of the at least one near-field object until near-field rendering is achieved (i.e., the relative viewpoint depth value meets, exceeds, or falls within the far-field depth threshold). In further embodiments, the transform determining component can generate modified stereoscopic projection transform(s) for rendering and transforming the at least one near-field object based at least in part on a formula (e.g., an asymptotic curve formula) programmatically implemented by the developer.

Figure 9:
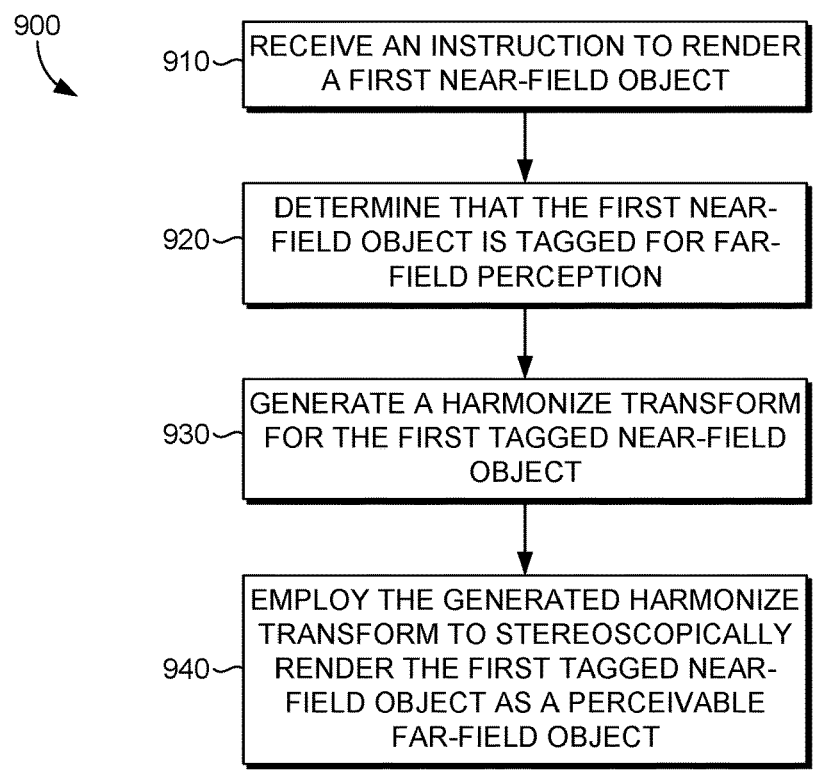
FIG. 9 is a flow diagram showing a method for rendering near-field objects as perceivable far-field objects within a virtual environment, in accordance with embodiments of the present invention.

Referring now to FIG. 9 in light of FIGS. 1-7, FIG. 9 is a flow diagram showing a method 900 for rendering a near-field object as a perceivable far-field object within a virtual environment. Each block of method 900 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Initially, at block 910, an instruction to render a first near-field object within a virtual environment is received. The virtual environment can include at least a second near-field object that is rendered therein based at least in part on one or more stereoscopic projection transforms. In some embodiments, the virtual environment can include a virtual skybox and/or a near-field particle system. For instance, a virtual environment can comprise a skybox including a plurality of stars and a particle system of stars overlaid thereon. In embodiments, the first and second near-field objects can be stereoscopically rendered within a virtual environment based at least in part on a single stereoscopic projection transform or a pair of unique stereoscopic projection transforms (e.g., a left and right ocular projection transform). In accordance with embodiments described herein, a transform can be a transformation matrix for at least moving, rotating, and/or scaling virtual objects that are renderable within the virtual environment. In some embodiments, the stereoscopic projection transform(s) can be generated by a transform determining component. The transform determining component can generate the stereoscopic projection transform(s) based at least in part on tracking data obtained from sensors integrated in or associated with a head mounted display. In further embodiments, the transform determining component can generate the stereoscopic projection transform(s) based further in part on a formula (e.g., an asymptotic curve formula) programmatically implemented by a developer.

At block 920, the first near-field object is determined to be configured for far-field perception within the virtual environment in response to receiving the instruction to render it. In some embodiments, the determination is made in response to receiving an instruction to stereoscopically render the first near-field object. The determination can be made using a near-field environment rendering component that can identify a tag or depth value associated with the first near-field object that corresponds with a classification of far-field perception. In other words, the tag or depth value can be the determinative factor on whether an object that is to be rendered by a GPU, or components thereof, is to be perceived as having infinite or far-field depth.

At block 930, a harmonize transform can be generated for the first near-field object configured (e.g., tagged or defined) for far-field perception. The harmonize transform can be generated based at least in part on one of the generated stereoscopic projection transform(s). The harmonize transform can be generated by a far-field perception harmonizing component that can obtain the stereoscopic projection transform(s) generated by the transform determining component. The harmonize transform can be generated by performing a transform operation on at least a portion of the generated stereoscopic projection transform(s). The transform operation can include one or more of an averaging operation, a translating operation, a rotating operation, and/or a scaling operation.

At block 940, the generated harmonize transform can be employed to stereoscopically render the first near-field object configured for far-field perception as a perceivable far-field object within the virtual environment. In other words, the first near-field object can be stereoscopically rendered, by a GPU or components thereof, utilizing the generated harmonize transform in replacement of the stereoscopic projection transform(s) generated by the transform determining component. In this way, the first near-field object configured for far-field perception can be perceivable as having infinite or far-field depth within the virtual environment because left and right ocular bias is eliminated by way of utilizing the harmonize transform(s). Meanwhile, the second near-field object is perceivable as having near-field depth within the virtual environment because it is rendered and transformed primarily in accordance with the generated stereoscopic projection transform(s).

In some further embodiments, a relative viewpoint depth value associated with a user can be obtained. In essence, the distance between the first near-field object configured for far-field perception and the user positioned in virtual space can be determined by the GPU or components thereof (e.g., the near-field environment rendering component). The relative viewpoint depth value can be obtained by the near-field environment rendering component to make a determination as to whether it meets, exceeds, or falls within a far-field depth threshold associated with the first near-field object configured for far-field perception. In some embodiments, the far-field depth threshold can be programmatically assigned to at least the first near-field object configured for far-field perception. Based on determining that the relative viewpoint depth value meets, exceeds, or falls within the far-field depth threshold associated with at least the first near-field object configured for far-field perception, at least portions of the stereoscopic projection transform(s) can be employed or utilized to stereoscopically render at least the first near-field object, now as a near-field object. In this way, the first near-field object is no longer rendered and transformed based on the harmonize transform(s), but instead can be rendered and transformed based at least on a portion of the stereoscopic projection transform(s). In further embodiments, the transform determining component can generate modified stereoscopic projection transform(s) for rendering and transforming at least the first near-field object based at least in part on a formula (e.g., an asymptotic curve formula) programmatically implemented by the developer.

Figure 10:
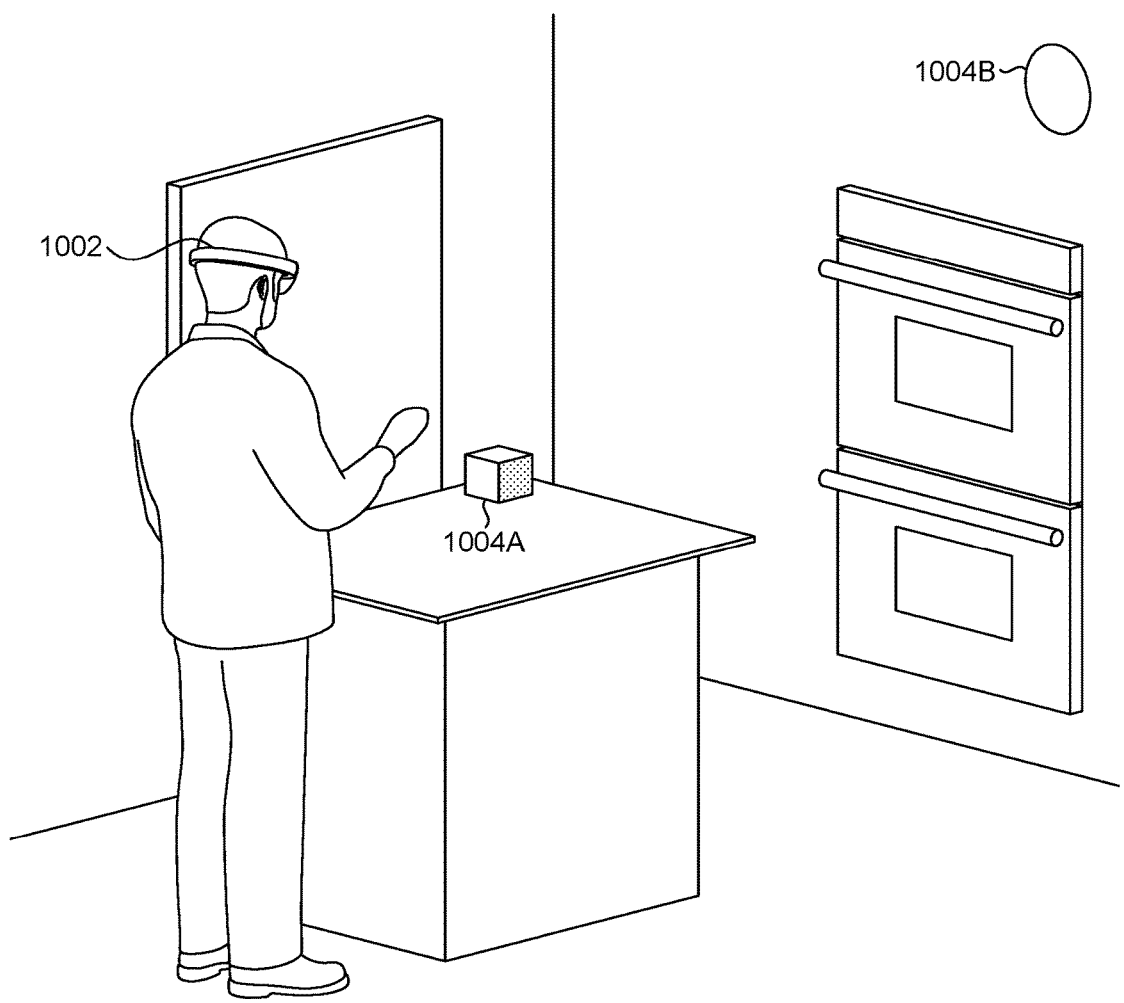
FIG. 10 is a schematic diagram showing exemplary augmented-reality images of a head-mounted display unit, in accordance with some embodiments of the present invention.

With reference to FIG. 10, exemplary images of a head-mounted display (HMD) device 1002 are depicted. Virtualized objects provided by the HMD device generally appear in virtual space in virtual reality configurations. However, in augmented reality configurations, virtualize objects (e.g., 1004A and 1004B) may appear superimposed on a background and may appear to interact with or be integral with the background. In augmented reality configurations, the background is comprised of a real-world scene, e.g., a scene that a user would perceive without augmented-reality image emitted by the HMD device. For example, the moon 1004B can appear superimposed and hanging high above the cooking oven, while the cube 1004A can appear sitting atop the countertop.

Figure 11:
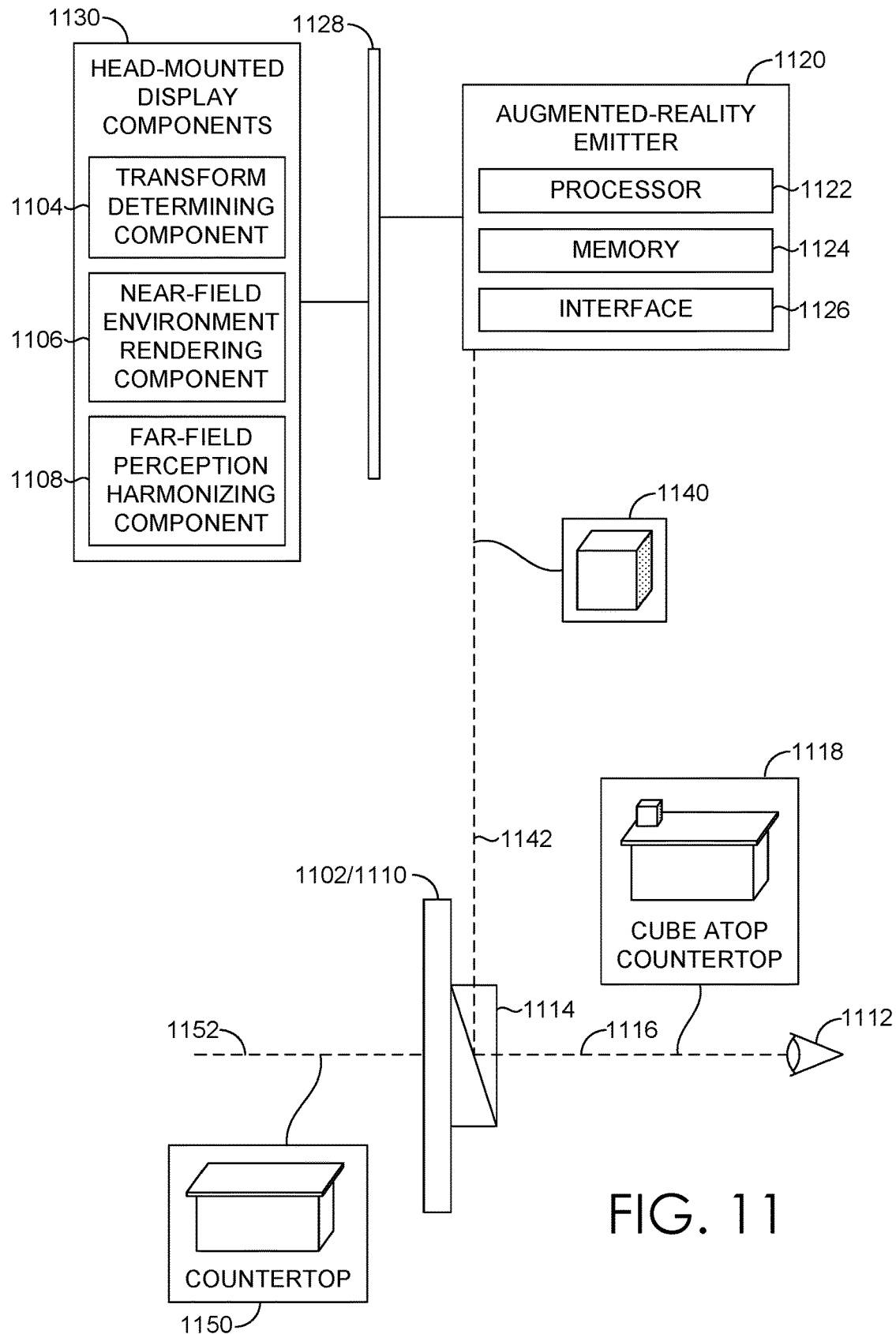
FIG. 11 is a block diagram of an exemplary head-mounted display unit, in accordance with some embodiments of the present invention.

Turning to FIG. 11, a mixed-reality HMD device 1102 for augmented reality applications having, among other things, a transform determining component 1104, a near-field environment rendering component 1106, and a far-field perception harmonizing component 1108, is described in accordance with an embodiment described herein. The HMD device 1102 includes a see-through lens 1110 which is placed in front of a user's eye 1112, similar to an eyeglass lens. It is contemplated that a pair of see-through lenses 1110 can be provided, one for each eye 1112. The lens 1110 includes an optical display component 1114, such as a beam splitter (e.g., a half-silvered mirror). The HMD device 1102 includes an augmented-reality emitter 1120 that facilitates altering the brightness of augmented-reality images. Amongst other components not shown, the HMD device also includes a processor 1122, memory 1124, interface 1126, a bus 1128, and additional HMD components 1130. The augmented-reality emitter 1120 emits light representing an augmented-reality image 1140 exemplified by a light ray 1142. Light from the real-world scene 1150, such as a light ray 1152, reaches the lens 1110. Additional optics can be used to refocus the augmented-reality image 1140 so that it appears to originate from several feet away from the eye 1112 rather than one inch away, where the display component 1114 actually is. The memory 1124 can contain instructions which are executed by the processor 1122 to enable the augmented-reality emitter 1120 to perform functions as described. One or more of the processors can be considered to be control circuits. The augmented-reality emitter communicates with the additional HMD components 1130 using the bus 1128 and other suitable communication paths.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The augmented-reality image 1140 is reflected by the display component 1114 toward a user's eye, as exemplified by a light ray 1116, so that the user sees an image 1118. In the image 1118, a portion of the real-world scene 1150, such as, a countertop is visible along with the entire augmented-reality image 1140 such as a cube. The user can therefore see a mixed-reality image 1118 in which the cube is sitting atop the countertop in this example.

Figure 12:
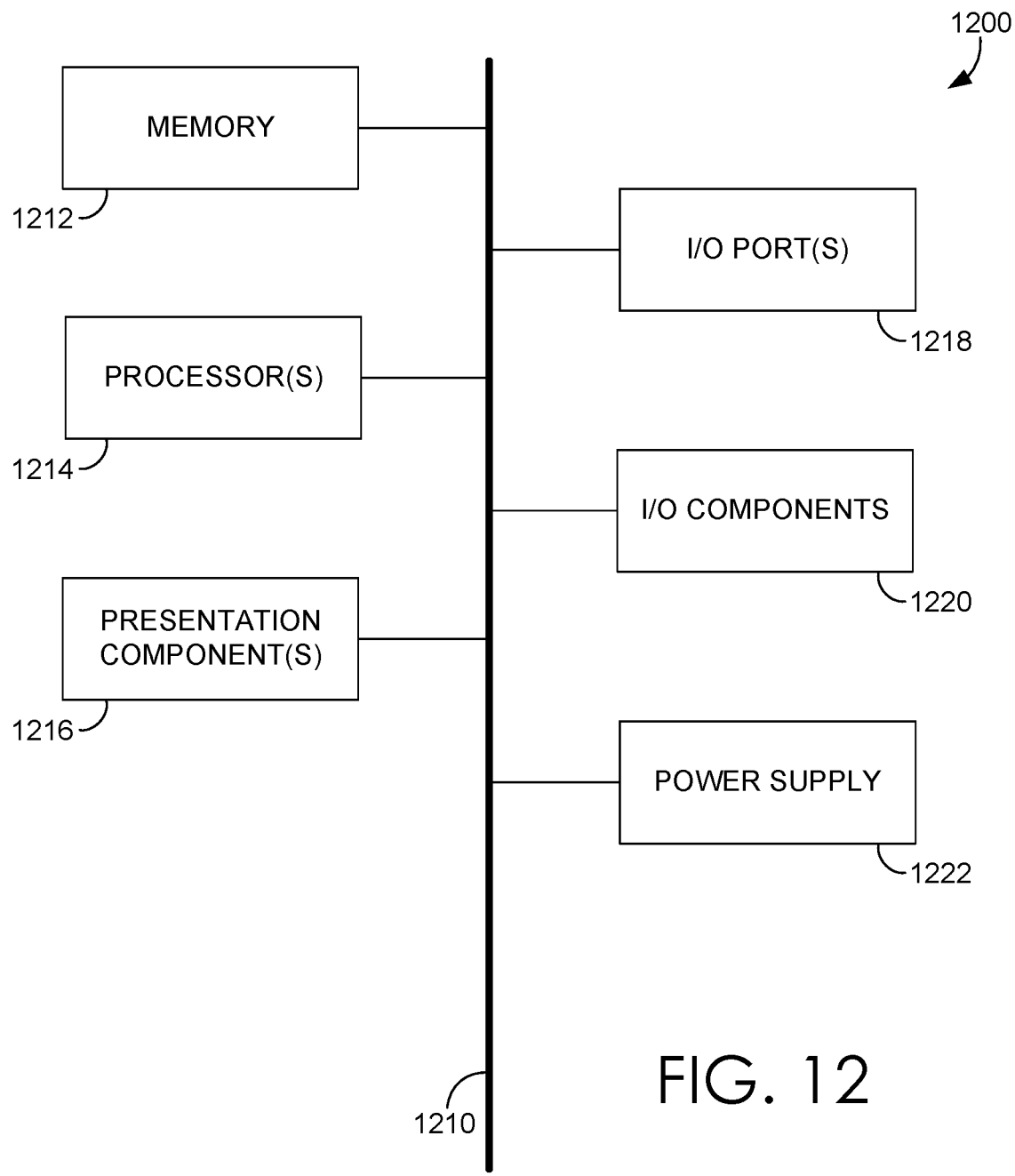
FIG. 12 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes a bus 1210 that directly or indirectly couples the following devices: memory 1212, one or more processors 1214, one or more presentation components 1216, input/output ports 1218, input/output components 1220, and an illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

Accordingly, in one embodiment described herein, a method rendering near-field objects as perceivable far-field objects within a virtual environment is provided. The method includes determining that at least one near-field object from a plurality of near-field objects is configured for far-field perception within the virtual environment, each near-field object in the plurality of near-field objects is stereoscopically renderable within the virtual environment based on at least one stereoscopic projection transform associated therewith. The method also includes generating at least one harmonize transform for the at least one configured near-field object, the at least one harmonize transform is based on at least a portion of the associated at least one stereoscopic projection transform. The method further includes employing the generated at least one harmonize transform to stereoscopically render each at least one configured near-field object for far-field perception within the virtual environment.

In some embodiments, the at least one stereoscopic projection transform comprises a left ocular projection transform and a right ocular projection transform.

In some embodiments, the left ocular projection transform is different than the right ocular projection transform.

In some embodiments, generating the at least one harmonize transform includes performing a transform operation on at least a portion of each stereoscopic projection transform.

In some embodiments, the transform operation includes at least one of an averaging operation, a translating operation, a rotating operation, and a scaling operation.

In some embodiments, employing the generated at least one harmonize transform includes stereoscopically rendering each at least one object configured for far-field perception utilizing the generated at least one harmonize transform instead of utilizing the at least one stereoscopic projection transform.

In some embodiments, the virtual environment is at least one of a skybox and a near-field particle system.

In some embodiments, the virtual environment includes at least one near-field object that is stereoscopically rendered based on the at least one stereoscopic projection transform.

In some embodiments, the determining is performed in response to receiving an instruction to stereoscopically render the at least one near-field object.

In some embodiments, determining that the at least one near-field object from the plurality of near-field objects is configured for far-field perception includes identifying that the at least one near-field object is tagged for far-field perception or that the at least one near-field object has a depth value that is within a predefined range.

In some embodiments, each transform is a matrix for at least moving, rotating, and/or scaling near-field objects rendered in the virtual environment.

In some embodiments, the method can further include obtaining a relative viewpoint depth value within the virtual environment, determining that the relative viewpoint depth value meets a far-field depth threshold associated with the at least one near-field object configured for far-field perception, and employing at least portions of the at least one stereoscopic projection transform to stereoscopically render the at least one near-field object configured for far-field perception based on determining that the relative viewpoint depth value exceeds the far-field depth threshold.

In another embodiment described herein, one or more computer storage media having computer-executable instructions embodied thereon that, when executed, by one or more processors, causing the one or more processors to execute operations for rendering near-field objects as perceivable far-field objects within a virtual environment, is provided. The operations include receiving an instruction to render a first near-field object within the virtual environment, the virtual environment including at least a second near-field object that is rendered based at least in part on one or more of stereoscopic projection transforms. The operations further include determining, in response to receiving the instruction, that the first near-field object is configured or "tagged" for far-field perception within the virtual environment. The operations also include generating at least one harmonize transform for the first configured or "tagged" near-field object, the at least one harmonize transform being based at least in part on a portion of the associated at least one stereoscopic projection transform. The operations further include employing the generated at least one harmonize transform, instead of the at least one stereoscopic projection transform, to stereoscopically render the first configured or "tagged" near-field object for far-field perception within the virtual environment.

In some embodiments, the at least one stereoscopic projection transform comprises a left ocular projection transform and a right ocular projection transform.

In some embodiments, the left ocular projection transform is different than the right ocular projection transform.

In some embodiments, generating the at least one harmonize transform includes performing a transform operation on at least a portion of each stereoscopic projection transform.

In some embodiments, the transform operation includes at least one of an averaging operation, a translating operation, a rotating operation, and a scaling operation.

In some embodiments, employing the generated at least one harmonize transform includes stereoscopically rendering the first near-field object configured for far-field perception utilizing the generated at least one harmonize transform instead of utilizing the at least one stereoscopic projection transform.

In some embodiments, the virtual environment is at least one of a skybox and a near-field particle system.

In some embodiments, the virtual environment includes at least one near-field object that is stereoscopically rendered based on the at least one stereoscopic projection transform.

In some embodiments, the determining is performed in response to receiving an instruction to stereoscopically render the at least one near-field object.

In some embodiments, determining that the first near-field object is configured or "tagged" for far-field perception includes identifying that the first near-field object has a depth value that is within a predefined range.

In some embodiments, each transform is a matrix for at least moving, rotating, and/or scaling near-field objects rendered in the virtual environment.

In some embodiments, the operations can further include obtaining a relative viewpoint depth value within the virtual environment, determining that the relative viewpoint depth value meets a far-field depth threshold associated with the first near-field object configured or tagged for far-field perception, and employing at least portions of the at least one stereoscopic projection transform to stereoscopically render the first near-field object configured or tagged for far-field perception based on determining that the relative viewpoint depth value exceeds the far-field depth threshold.

In yet another embodiment described herein, a system for rendering near-field objects as perceivable far-field objects within a virtual environment is provided. The system includes a processor and a memory configured for providing computer program instructions, associated with computer components, to the processor. The system further includes a far-field perception harmonizing component configured to generate at least one harmonize transform for a near-field object configured for far-field perception, the at least one harmonize transform being based at least in part on one of at least one stereoscopic projection transform associated with the configured near-field object, the at least one stereoscopic projection transform being employable to stereoscopically render the near-field object within the virtual environment, and the at least one harmonize transform being employable to stereoscopically render the near-field object as a far-field object within the virtual environment.

In some embodiments, the system includes a transform determining component for obtaining tracking data generated by sensors associated with the HMD. The tracking data is generated by one or more sensors that detect, among other things, a position (e.g., Cartesian coordinate values), an orientation, yaw, pitch, and/or roll of the HMD worn by a user.

In some embodiments, the sensors include a magnetometer for determining the absolute orientation of the HMD, an accelerometer for measuring changes in velocity and changes in position of the HMD, and a gyroscope for measuring changes in orientation or changes in rotational velocity of the HMD. The HMD can include any number and/or combination of sensors listed or not listed here in the present disclosure. A non-limiting list of exemplary HMDs may include the Microsoft HoloLens®, the Oculus Rift® CV1 or DK2, the HTC Vive®, the Meta 2® Development Kit, the Samsung Gear VR®, and the like. It is contemplated that embodiments described herein can be implemented in any HMD or software associated for use therewith, including those listed in the aforementioned list, as well as past and future iterations thereof.

In some embodiments, the combined tracking data received from the sensors is analyzed by the transform determining component to determine a position and orientation of the HMD.

In some embodiments, the transform determining component obtains the tracking data by either retrieving the tracking data from the sensors, or receiving the tracking data sent from the sensors.

In some embodiments, the transform determining component generates at least one stereoscopic projection transform based on the obtained tracking data and/or based on the determined position and orientation of the HMD.

In some embodiments, the system further includes a near-field environment rendering component for stereoscopically rendering and/or transforming the near-field object within the virtual environment utilizing or employing one or more transforms (e.g., transformation matrices).

In some embodiments, the one or more transform comprises at least one stereoscopic projection transform and/or at least one harmonize transform.

In some embodiments, the near-field environment rendering component determines whether the object near-field object is configured for far-field perception.

In some embodiments, when the near-field environment rendering component determines that the near-field object is configured for far-field perception, it sends a request to a far-field perception harmonizing component to generate at least one harmonize transform for the configured object.

In some embodiments, the near-field environment rendering component can further obtain a relative viewpoint depth value within the virtual environment, determine that the relative viewpoint depth value meets a far-field depth threshold associated with the configured near-field object, and employ at least portions of the at least one stereoscopic projection transform to stereoscopically render the configured near-field object based on determining that the relative viewpoint depth value exceeds the far-field depth threshold.

In some embodiments, the far-field perception harmonizing component generates the harmonize transform(s) for the configured object in response to receiving the request.

In some embodiments, the far-field perception harmonizing component is configured to continuously generate harmonize transform(s) for all near-field objects to-be-rendered as tracking data is obtained. In this regard, the far-field perception harmonizing component responds to the request with the generated harmonize transform(s).

In some embodiments, stereoscopically rendering the near-field object as a far-field object within the virtual environment includes utilizing at least one harmonize transform (e.g., a transformation matrix) to render the near-field object within the virtual environment.

In some embodiments, utilizing the at least one harmonize transform prevents left and right eye perception bias.

In some embodiments, the at least one stereoscopic projection transform comprises a left ocular projection transform and a right ocular projection transform.

In some embodiments, the left ocular projection transform is different than the right ocular projection transform.

In some embodiments, generating the at least one harmonize transform includes performing a transform operation on at least a portion of each stereoscopic projection transform.

In some embodiments, the transform operation includes at least one of an averaging operation, a translating operation, a rotating operation, and a scaling operation.

In some embodiments, employing the generated at least one harmonize transform includes stereoscopically rendering the first near-field object configured for far-field perception utilizing the generated at least one harmonize transform instead of utilizing the at least one stereoscopic projection transform.

In some embodiments, the virtual environment is at least one of a skybox and a near-field particle system.

In some embodiments, the virtual environment includes at least one near-field object that is stereoscopically rendered based on the at least one stereoscopic projection transform.

In some embodiments, the determining is performed in response to receiving an instruction to stereoscopically render the at least one near-field object.

In some embodiments, determining that the first near-field object is configured or "tagged" for far-field perception includes identifying that the first near-field object has a depth value that is within a predefined range.

In some embodiments, each transform is a matrix for at least moving, rotating, and/or scaling near-field objects rendered in the virtual environment.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display unit; however, the head-mounted display unit depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for rendering near-field objects as perceivable far-field objects within a near-field virtual environment, the method comprising:
   determining that a virtual object is tagged for far-field perception within the near-field virtual environment, wherein the virtual object has a corresponding set of stereoscopic projection transforms that is employable to stereoscopically render the virtual object as a near-field object with ocular bias between left eye and right eye rendered instances of the near-field object for near-field perception within the near-field virtual environment;

based on the determination that the virtual object is tagged for far-field perception, generating a set of harmonize transforms based on at least a portion of the corresponding set of stereoscopic projection transforms, the set of harmonize transforms providing a reduced ocular bias between the left eye and the right eye rendered instances of the near-field object as compared to the set of stereoscopic projection transforms; and employing the generated set of harmonize transforms to stereoscopically render the virtual object tagged for far-field perception within the near-field virtual environment as the near-field object having the reduced ocular bias.

2. The method of claim 1, wherein the at least one stereoscopic projection transform comprises a left ocular projection transform and a right ocular projection transform.

3. The method of claim 2, wherein the left ocular projection transform is different than the right ocular projection transform.

4. The method of claim 1, wherein generating the at least one harmonize transform includes performing a transform operation to at least a portion of each stereoscopic projection transform.

5. The method of claim 4, wherein the transform operation includes at least one of an averaging operation, a translating operation, a rotating operation, and a scaling operation.

6. The method of claim 1, wherein the near-field virtual environment includes at least one of a skybox and a near-field particle system.

7. The method of claim 1, at least one other virtual object is stereoscopically rendered for near-field perception within the near-field virtual environment based on another corresponding set of stereoscopic projection transforms.

8. The method of claim 1, wherein the determination is made based on a received instruction to stereoscopically render the virtual object.

9. The method of claim 1, wherein a transform includes a matrix employable to at least move, rotate, and/or scale one or more objects rendered in the virtual environment.

10. The method of claim 1, further comprising:
obtaining a relative viewpoint depth value within the virtual environment; and
employing at least the portion of the corresponding set of stereoscopic projection transforms to stereoscopically render the tagged virtual object based on a determination that the obtained relative viewpoint depth value exceeds a far-field depth threshold value associated with the tagged virtual object.

11. A method for rendering near-field objects as perceivable far-field objects within a near-field virtual environment, the method performed by one or more processors executing instructions stored on one or more computer storage media devices, the method comprising:
receiving an instruction to render a first virtual object within the near-field virtual environment, the near-field virtual environment including at least a second virtual object that is rendered therein based on at least a corresponding set of stereoscopic projection transforms that is employable to stereoscopically render the second virtual object as a second near-field object with ocular bias between left eye and right eye rendered instances of the second near-field object for near-field perception within the near-field virtual environment;
generating a set of harmonize transforms for the first virtual object in response to a determination that the first virtual object includes a depth value that is within a predefined range of depth values, the set of harmonize transforms being generated based at least in part on a portion of the corresponding set of stereoscopic projection transforms, the set of harmonize transforms providing a reduced ocular bias between the left eye and the right eye rendered instances of the first near-field object as compared to the set of stereoscopic projection transforms; and
employing the generated set of harmonize transforms, instead of the corresponding set of stereoscopic projection transforms, to stereoscopically render the first virtual object as a perceivable far-field object within the near-field virtual environment as a first near-field object having the reduced ocular bias.

12. The method of claim 11, wherein the near-field virtual environment includes at least one of a skybox and a near-field particle system.

13. The method of claim 11, wherein at least one harmonize transform is generated based at least in part on an averaged portion of each stereoscopic projection transform included in the corresponding set of stereoscopic projection transforms.

14. The method of claim 11, wherein a stereoscopic projection transform includes a transform matrix that is employable to render one or more virtual objects within the near-field virtual environment based on a defined pair of perspective positions within the near-field virtual environment.

15. The method of claim 14, wherein at least one generated harmonize transform includes a common matrix that is employable to render one or more virtual objects within the near-field virtual environment based on any perspective position in a plurality of perspective positions within the near-field virtual environment.

16. A system for rendering near-field objects as perceivable far-field objects within a near-field virtual environment, the system comprising:
a graphics processing unit (GPU) including
a far-field perception harmonizing component configured to:
generate a set of harmonize transforms for a virtual object determined defined for far-field perception within the near-field virtual environment, the set of harmonize transforms being generated based on at least a portion of a set of stereoscopic projection transforms that correspond to the virtual object employable to stereoscopically render the virtual object as a near-field object with ocular bias between left eye and right eye rendered instances of the near-field object, the set of harmonize transforms providing a reduced ocular bias between the left eye and the right eye rendered instances of the near-field object as compared to the set of stereoscopic projection transforms, wherein the generated set of harmonize transforms is employable to stereoscopically render the virtual object for far-field perception within the near-field virtual environment as the near-field object having the reduced ocular bias.

17. The system of claim 16, wherein the virtual object is determined defined for far-field perception based on a determination that either the virtual object includes a tag for far-field perception or the virtual object includes a depth value that is defined within a predefined range.

18. The system of claim 16, wherein the virtual object is stereoscopically rendered as a far-field object within the near-field virtual environment based on a transform operation performed on at least a portion of each stereoscopic projection transform included in the corresponding set of stereoscopic projection transforms.

\* \* \* \* \*